US012634846B2

(12) United States Patent
Jiang et al.

(10) Patent No.: US 12,634,846 B2
(45) Date of Patent: May 19, 2026

(54) COMMUNICATION METHOD AND APPARATUS AND COMPUTER-READABLE STORAGE MEDIUM

(71) Applicant: HUAWEI TECHNOLOGIES CO., LTD., Shenzhen (CN)

(72) Inventors: Zhenjun Jiang, Hangzhou (CN); Hejia Luo, Hangzhou (CN); Yunfei Qiao, Hangzhou (CN); Jianwei Zhou, Hangzhou (CN); Chenlei Xu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 533 days.

(21) Appl. No.: 18/156,606

(22) Filed: Jan. 19, 2023

(65) Prior Publication Data

US 2023/0156640 A1 May 18, 2023

Related U.S. Application Data

(63) Continuation of application No. PCT/CN2021/104524, filed on Jul. 5, 2021.

(30) Foreign Application Priority Data

Jul. 20, 2020 (CN) .......................... 202010701767.2

(51) Int. Cl.
*H04W 56/00* (2009.01)
*H04L 27/26* (2006.01)
(52) U.S. Cl.
CPC ....... *H04W 56/001* (2013.01); *H04L 27/2605* (2013.01)

(58) Field of Classification Search
None
See application file for complete search history.

(56) References Cited

U.S. PATENT DOCUMENTS

| | | | |
|---|---|---|---|
| 11,903,051 B2 * | 2/2024 | Masini | ................. H04W 76/12 |
| 2017/0208516 A1 * | 7/2017 | Kubota | ................. H04L 5/0051 |
| 2018/0124718 A1 * | 5/2018 | Ng | ...................... H04W 56/001 |
| 2021/0037485 A1 * | 2/2021 | Khettry | ................ H04L 5/0044 |

(Continued)

FOREIGN PATENT DOCUMENTS

CN        110637488 A      12/2019

OTHER PUBLICATIONS

3GPP TS 38.211 V16.2.0 (Jun. 2020); 3rd Generation Partnership Project; Technical Specification Group Radio Access Network; NR; Physical channels and modulation (Release 16); total 131 pages.

(Continued)

*Primary Examiner* — Anh Vu H Ly

(74) *Attorney, Agent, or Firm* — WOMBLE BOND DICKINSON (US) LLP

(57) ABSTRACT

This application provides a communication method and apparatus and a computer-readable storage medium. The method includes: receiving one or more synchronization information blocks SSBs; determining, based on a first SSB and/or a second SSB, a network type corresponding to the one or more SSBs; and determining an access network based on the network type. According to technical solutions provided in this application, a network type of an access network can be accurately identified in a frequency sweep stage.

20 Claims, 7 Drawing Sheets

(56)        References Cited

U.S. PATENT DOCUMENTS

2021/0194571 A1*   6/2021  Ma ..................... H04B 7/18504
2021/0250816 A1*   8/2021  Xu .................... H04W 36/0016
2021/0385773 A1*  12/2021  Ma ......................... H04B 7/185
2022/0150849 A1*   5/2022  Zhao .................. H04L 27/2626
2022/0201629 A1*   6/2022  Ko ....................... H04W 56/00

OTHER PUBLICATIONS

3GPP TS 38.212 V16.1.0 (Mar. 2020); 3rd Generation Partnership
Project; Technical Specification Group Radio Access Network; NR;
Multiplexing and channel coding (Release 16); total 146 pages.
3GPP TS 38.104 V16.4.0 (Jun. 2020), 3rd Generation Partnership
Project; Technical Specification Group Radio Access Network; NR;
Base Station (BS) radio transmission and reception (Release 16),
total 266 pages.

* cited by examiner

201

202

Sequence of a first PSS: [1 2 3 4 ... 127]

→ Add 0 to an end

Sequence SEQI: [1 2 3 4 ... 127 0]

→ Mapping

First matrix:

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|----|----|----|----|----|----|----|----|----|----|----|----|----|----|----|----|----|----|----|----|----|----|----|
| 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 |
| 65 | 66 | 67 | 68 | 69 | 70 | 71 | 72 | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | 96 |
| 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 | 121 | 122 | 123 | 124 | 125 | 126 | 127 | 0 |

→ Column permutation

Second matrix:

| 10 | 6 | 4 | 8 | 1 | 28 | 30 | 16 | 12 | 15 | 11 | 14 | 31 | 3 | 19 | 32 | 20 | 22 | 25 | 29 | 21 | 27 | 17 | 2 | 13 | 26 | 18 | 5 | 9 | 7 | 23 | 24 |
|----|---|---|---|---|----|----|----|----|----|----|----|----|---|----|----|----|----|----|----|----|----|----|---|----|----|----|---|---|---|----|----|
| 42 | 38 | 36 | 40 | 33 | 60 | 62 | 48 | 44 | 47 | 43 | 46 | 63 | 35 | 51 | 64 | 52 | 54 | 57 | 61 | 53 | 59 | 49 | 34 | 45 | 58 | 50 | 37 | 41 | 39 | 55 | 56 |
| 74 | 70 | 68 | 72 | 65 | 92 | 94 | 80 | 76 | 79 | 75 | 78 | 95 | 67 | 83 | 96 | 84 | 86 | 89 | 93 | 85 | 91 | 87 | 66 | 77 | 90 | 82 | 69 | 73 | 71 | 87 | 88 |
| 106 | 102 | 100 | 104 | 97 | 124 | 126 | 112 | 108 | 111 | 107 | 110 | 127 | 99 | 115 | 0 | 116 | 118 | 121 | 125 | 117 | 123 | 113 | 98 | 109 | 122 | 114 | 101 | 105 | 103 | 119 | 120 |

→ Collect data by column

Sequence of a second PSS: [10 42 74 106 ... 32 64 96 20 52 84 116 ... 24 56 88 120]

FIG. 6

COMMUNICATION METHOD AND APPARATUS AND COMPUTER-READABLE STORAGE MEDIUM

CROSS-REFERENCE TO RELATED APPLICATIONS

This application is a continuation of International Application No. PCT/CN2021/104524, filed on Jul. 5, 2021, which claims priority to Chinese Patent Application No. 202010701767.2, filed on Jul. 20, 2020. The disclosures of the aforementioned applications are hereby incorporated by reference in their entireties.

TECHNICAL FIELD

This application relates to the field of wireless communication technologies, and in particular, to a communication method and apparatus and a computer-readable storage medium.

BACKGROUND

A 5th generation mobile network (5G) and a 5G evolved network need to meet service requirements of various industries, and further need to provide wider service coverage. A limited coverage capability of a current terrestrial mobile communication network can no longer meet people's requirements of obtaining information at any time and any place. Satellite communication has features of a long communication distance, a large coverage area, flexible networking, and the like, and can overcome natural and geological obstacles such as oceans, deserts, and mountains. Therefore, the satellite communication may serve as an effective supplement to a conventional network.

In further 5G evolution of the 3rd generation partnership project (3GPP), a satellite-terrestrial convergence scenario needs to be considered. For example, a 5G terrestrial access network technology is adapted to the satellite communication, so that a coverage area of a communication network can be greatly expanded. Therefore, two different network types need to be distinguished in a frequency sweep stage: a non-terrestrial network (NTN) and a new radio access technology (NR), so that a terminal device may select different network types to determine an access network for communication. According to a current existing protocol of the 3GPP, a same frequency band and frequency may be used for different network types. However, when a same frequency band and frequency are used for NR and the NTN, a network type of an access network cannot be determined in the frequency sweep stage.

SUMMARY

Embodiments of this application provide a communication method and apparatus and a computer-readable storage medium, to accurately identify a network type of an access network in a frequency sweep stage.

According to a first aspect, this application provides a communication method. The method may be applied to a terminal device, or may be applied to a module (for example, a chip) in a terminal device. An example in which the method is applied to a terminal device is used below for description. The method includes: receiving one or more synchronization signal blocks (synchronization signal/ PBCH block, SSB); determining, based on a first SSB and/or a second SSB, a network type corresponding to the one or more SSBs; and determining an access network based on the network type.

In the solution provided in this application, after receiving the one or more SSBs, the terminal device may determine, based on the first SSB and/or the second SSB, the network type corresponding to the one or more SSBs, and then determine the access network based on the network type. It can be learned that the network type of the access network can be accurately identified in a frequency sweep stage.

With reference to the first aspect, in an embodiment of the first aspect, the SSB includes a primary synchronization signal (PSS), and the determining, based on a first SSB and/or a second SSB, a network type corresponding to the one or more SSBs includes: when the PSS successfully matches a first PSS, determining that the network type corresponding to the SSB is a first network type, where the first PSS is a PSS in the first SSB; and/or when the PSS successfully matches a second PSS, determining that the network type corresponding to the SSB is a second network type, where the second PSS is a PSS in the second SSB.

In the solution provided in this application, after receiving the one or more SSBs, the terminal device may perform blind detection on the PSS and the first PSS, or may perform blind detection on the PSS and the second PSS; and when the blind detection on the PSS and the first PSS succeeds, determine that the network type corresponding to the SSB is the first network type; and/or when the blind detection on the PSS and the second PSS succeeds, determine that the network type corresponding to the SSB is the second network type. It can be learned that the network type of the access network can be accurately identified in the frequency sweep stage based on different PSSs.

With reference to the first aspect, in an embodiment of the first aspect, the SSB includes a secondary synchronization signal (SSS), and the determining, based on a first SSB and/or a second SSB, a network type corresponding to the one or more SSBs includes: when the SSS successfully matches a first SSS, determining that the network type corresponding to the SSB is a first network type, where the first SSS is an SSS in the first SSB; and/or when the SSS successfully matches a second SSS, determining that the network type corresponding to the SSB is a second network type, where the second SSS is an SSS in the second SSB.

In the solution provided in this application, after receiving the one or more SSBs, the terminal device may perform blind detection on the SSS and the first SSS, or may perform blind detection on the SSS and the second SSS; and when the blind detection on the SSS and the first SSS succeeds, determine that the network type corresponding to the SSB is the first network type; and/or when the blind detection on the SSS and the second SSS succeeds, determine that the network type corresponding to the SSB is the second network type. It can be learned that the network type of the access network can be accurately identified in the frequency sweep stage based on different SSSs.

With reference to the first aspect, in an embodiment of the first aspect, the SSB includes a physical broadcast channel (PBCH), and the determining, based on a first SSB and/or a second SSB, a network type corresponding to the one or more SSBs includes: when the PBCH is successfully descrambled by using a first pseudo-random sequence, determining that the network type corresponding to the SSB is a first network type; and/or when the PBCH is successfully descrambled by using a second pseudo-random sequence, determining that the network type corresponding to the SSB is a second network type.

In the solution provided in this application, after receiving the one or more SSBs, the terminal device may descramble the PBCH by using the first pseudo-random sequence, or may descramble the PBCH by using the second PBCH; and when the PBCH is successfully descrambled by using the first pseudo-random sequence, determine that the network type corresponding to the SSB is the first network type; and/or when the PBCH is successfully descrambled by using the second pseudo-random sequence, determine that the network type corresponding to the SSB is the second network type. It can be learned that the network type of the access network can be accurately identified in the frequency sweep stage based on PBCH descrambling performed by using different pseudo-random sequences.

With reference to the first aspect, in an embodiment of the first aspect, the determining, based on a first SSB and/or a second SSB, a network type corresponding to the one or more SSBs includes: when a frame structure of the SSB matches a frame structure of the first SSB, determining that the network type corresponding to the SSB is a first network type; and/or when a frame structure of the SSB matches a frame structure of the second SSB, determining that the network type corresponding to the SSB is a second network type, where the frame structure of the SSB includes frequency domain mapping locations and time domain mapping locations corresponding to a PSS, an SSS, and a PBCH in the SSB.

In the solution provided in this application, after receiving the one or more SSBs, the terminal device may perform matching between the frame structure of the first SSB and the frame structure of the SSB, or may perform matching between the frame structure of the second SSB and the frame structure of the SSB; and when the frame structure of the SSB matches the frame structure of the first SSB, determine that the network type corresponding to the SSB is the first network type; and/or when the frame structure of the SSB matches the frame structure of the second SSB, determine that the network type corresponding to the SSB is the second network type. It can be learned that the network type of the access network can be accurately identified in the frequency sweep stage based on different frame structures matching the SSB.

With reference to the first aspect, in an embodiment of the first aspect, the first network type is new radio NR, and the second network type is a non-terrestrial network NTN.

With reference to the first aspect, in an embodiment of the first aspect, a sequence of the second PSS and a sequence of the first PSS meet a frequency domain mapping relationship, and/or a sequence of the second PSS is obtained by interleaving a sequence of the first PSS, and/or a cyclic shift value and/or a primitive polynomial of the second PSS are or is different from a cyclic shift value and/or a primitive polynomial of the first PSS.

In the solution provided in this application, the sequence of the first PSS may be re-mapped in frequency domain based on the sequence of the first PSS, so that the second PSS is different from the first PSS; or the sequence of the first PSS may be interleaved based on the sequence of the first PSS to obtain the sequence of the second PSS, so that the second PSS is different from the first PSS; or the sequence of the second PSS may be determined based on a cyclic shift value and/or a primitive polynomial that are different from those of the sequence of the first PSS, without being based on the sequence of the first PSS, so that the second PSS is different from the first PSS. The second PSS is different from the first PSS, and therefore the first SSB is different from the second SSB. The terminal device can distinguish between the first network type and the second network type by performing blind detection on the sequence of the first PSS and the sequence of the second PSS through frequency sweeping, and further determine the access network.

With reference to the first aspect, in an embodiment of the first aspect, numbers of the sequence, of the second PSS, that is obtained by mapping the sequence of the first PSS in frequency domain are as follows: [119 87 55 23 123 91 59 27 125 93 61 29 121 89 57 25 96 64 32 101 69 37 5 99 67 35 3 113 81 49 17 117 85 53 21 114 82 50 18 118 86 54 22 115 83 51 19 98 66 34 2 126 94 62 30 110 78 46 14 97 65 33 1 109 77 45 13 107 75 43 11 104 72 40 8 100 68 36 4 108 76 44 12 102 70 38 6 112 80 48 16 127 95 63 31 116 84 52 20 103 71 39 7 111 79 47 15 124 92 60 28 120 88 56 24 122 90 58 26 106 74 42 10 105 73 41 9].

In the solution provided in this application, the sequence number of the second PSS may be obtained by mapping the sequence of the first PSS in frequency domain. With the sequence number, cross-correlation between sequences of the second PSS and between the sequence of the second PSS and the sequence of the first PSS can be reduced.

With reference to the first aspect, in an embodiment of the first aspect, a sequence of the SSS is determined based on a cell parameter identifier ID, and a cell parameter identifier ID for determining a sequence of the second SSS is different from a cell parameter identifier ID for determining a sequence of the first SSS.

In the solution provided in this application, the cell parameter ID used to determine the sequence of the second SSS may be extended, so that the cell parameter identifier ID for determining the sequence of the second SSS is different from the cell parameter identifier ID for determining the sequence of the first SSS. The second SSS is different from the first SSS, and therefore the first SSB is different from the second SSB. The terminal device can distinguish between the first network type and the second network type by performing blind detection on the sequence of the first SSS and the sequence of the second SSS through frequency sweeping, and further determine the access network.

With reference to the first aspect, in an embodiment of the first aspect, the first pseudo-random sequence is used to descramble a first PBCH, the second pseudo-random sequence is used to descramble a second PBCH, the first PBCH is a PBCH in the first SSB, the second PBCH is a PBCH in the second SSB, and an initial value for determining the first pseudo-random code is different from an initial value for determining the second pseudo-random code.

In the solution provided in this application, an initial value used to determine a pseudo-random sequence of the first PBCH is different from an initial value used to determine a pseudo-random sequence of the second PBCH, and the pseudo-random sequence of the first PBCH is different from the pseudo-random sequence of the second PBCH. Therefore, when descrambling the PBCH in the received SSB by using the first pseudo-random sequence and the second pseudo-random sequence, the terminal device can distinguish between the first network type and the second network type, and further determine the access network.

With reference to the first aspect, in an embodiment of the first aspect, that a sequence of the second PSS is obtained by interleaving a sequence of the first PSS includes: adding 0 to an end of the sequence of the first PSS to obtain a sequence, where the sequence is a sequence of 2 to a power of N, and N is an integer greater than or equal to 0; mapping the sequence to a matrix block in order of rows to obtain a first matrix, where the matrix block is a $2^J \times 2^K$ matrix block, J is an integer greater than or equal to 0, K is an integer greater than or equal to 0, and N is equal to a sum of J and K; performing column permutation on the first matrix to obtain a second matrix; and reading data of the second matrix by column to obtain the sequence of the second PSS.

With reference to the first aspect, in an embodiment of the first aspect, a frequency domain mapping location and/or a time domain mapping location corresponding to one or more of a PSS, an SSS, and a PBCH in the first SSB are or is different from a frequency domain mapping location and/or a time domain mapping location corresponding to one or more of a PSS, an SSS, and a PBCH in the second SSB.

In the solution provided in this application, a frequency domain mapping location and/or a time domain mapping location corresponding to one or more of the PSS, the SSS, and the PBCH in the SSB may be changed to distinguish between the first SSB and the second SSB. Therefore, the terminal device can distinguish between the first network type and the second network type in the frequency sweep stage, and further determine the access network.

According to a second aspect, this application provides a communication method. The method may be applied to a network device, or may be applied to a module (for example, a chip) in a network device. An example in which the method is applied to a network device is used below for description. The method includes: determining an SSB; and sending the SSB to a terminal device, where the SSB is a first SSB or a second SSB, the first SSB and the second SSB correspond to different network types, and the SSB is used by the terminal device to determine a network type.

In the solution provided in this application, after determining the SSB, the network device may send the determined SSB to the terminal device, where the SSB is the first SSB or the second SSB, and the first SSB and the second SSB correspond to different network types. The terminal device may receive one or more SSBs, and determine a network type based on the received SSB, so as to determine an access network. In this way, a first network type and a second network type can be distinguished in a frequency sweep process while impact on an existing terminal device and protocol is minimized, so as to determine the access network.

With reference to the second aspect, in an embodiment of the second aspect, the SSB includes a PSS, a PSS in the first SSB is a first PSS, a PSS in the second SSB is a second PSS, and a sequence of the second PSS and a sequence of the first PSS meet a frequency domain mapping relationship, and/or a sequence of the second PSS is obtained by interleaving a sequence of the first PSS, and/or a cyclic shift value and/or a primitive polynomial of the second PSS are or is different from a cyclic shift value and/or a primitive polynomial of the first PSS.

In the solution provided in this application, the sequence of the first PSS may be re-mapped in frequency domain based on the sequence of the first PSS, so that the second PSS is different from the first PSS; or the sequence of the first PSS may be interleaved based on the sequence of the first PSS to obtain the sequence of the second PSS, so that the second PSS is different from the first PSS; or the sequence of the second PSS may be determined based on a cyclic shift value and/or a primitive polynomial that are different from those of the sequence of the first PSS, without being based on the sequence of the first PSS, so that the second PSS is different from the first PSS. The second PSS is different from the first PSS, and therefore the first SSB is different from the second SSB. The terminal device can distinguish between the first network type and the second network type by performing blind detection on the sequence of the first PSS and the sequence of the second PSS through frequency sweeping, and further determine the access network.

With reference to the second aspect, in an embodiment of the second aspect, numbers of the sequence, of the second PSS, that is obtained by mapping the sequence of the first PSS in frequency domain are as follows: [119 87 55 23 123 91 59 27 125 93 61 29 121 89 57 25 96 64 32 101 69 37 5 99 67 35 3 113 81 49 17 117 85 53 21 114 82 50 18 118 86 54 22 115 83 51 19 98 66 34 2 126 94 62 30 110 78 46 14 97 65 33 1 109 77 45 13 107 75 43 11 104 72 40 8 100 68 36 4 108 76 44 12 102 70 38 6 112 80 48 16 127 95 63 31 116 84 52 20 103 71 39 7 111 79 47 15 124 92 60 28 120 88 56 24 122 90 58 26 106 74 42 10 105 73 41 9].

In the solution provided in this application, the sequence number of the second PSS may be obtained by mapping the sequence of the first PSS in frequency domain. With the sequence number, cross-correlation between sequences of the second PSS and between the sequence of the second PSS and the sequence of the first PSS can be reduced.

With reference to the second aspect, in an embodiment of the second aspect, the SSB includes an SSS, a sequence of the SSS is determined based on a cell parameter identifier ID, an SSS in the first SSB is a first SSS, an SSS in the second SSB is a second SSS, and a cell parameter identifier ID for determining a sequence of the second SSS is different from a cell parameter identifier ID for determining a sequence of the first SSS.

In the solution provided in this application, the cell parameter ID used to determine the sequence of the second SSS may be extended, so that the cell parameter identifier ID for determining the sequence of the second SSS is different from the cell parameter identifier ID for determining the sequence of the first SSS. The second SSS is different from the first SSS, and therefore the first SSB is different from the second SSB. The terminal device can distinguish between the first network type and the second network type by performing blind detection on the sequence of the first SSS and the sequence of the second SSS through frequency sweeping, and further determine the access network.

With reference to the second aspect, in an embodiment of the second aspect, the SSB includes a PBCH, a PBCH in the first SSB is a first PBCH, a PBCH in the second SSB is a second PBCH, an initial value for determining the first PBCH is different from an initial value for determining the second PBCH, the initial value is used to determine a pseudo-random sequence, and the pseudo-random sequence is used to scramble the PBCH.

In the solution provided in this application, an initial value used to determine a pseudo-random sequence of the first PBCH is different from an initial value used to determine a pseudo-random sequence of the second PBCH, and the pseudo-random sequence of the first PBCH is different from the pseudo-random sequence of the second PBCH. Therefore, when descrambling the PBCH in the received SSB by using a first pseudo-random sequence and a second pseudo-random sequence, the terminal device can distinguish between the first network type and the second network type, and further determine the access network.

With reference to the second aspect, in an embodiment of the second aspect, that a sequence of the second PSS is obtained by interleaving a sequence of the first PSS includes: adding 0 to an end of the sequence of the first PSS to obtain a sequence, where the sequence is a sequence of 2 to a power of N, and N is an integer greater than or equal to 0; mapping the sequence to a matrix block in order of rows to obtain a first matrix, where the matrix block is a $2^J \times 2^K$ matrix block, J is an integer greater than or equal to 0, K is an integer greater than or equal to 0, and N is equal to a sum of J and K; performing column permutation on the first matrix to obtain a second matrix; and reading data of the second matrix by column to obtain the sequence of the second PSS.

With reference to the second aspect, in an embodiment of the second aspect, a frequency domain mapping location and/or a time domain mapping location corresponding to one or more of a PSS, an SSS, and a PBCH in the first SSB are or is different from a frequency domain mapping location and/or a time domain mapping location corresponding to one or more of a PSS, an SSS, and a PBCH in the second SSB.

In the solution provided in this application, a frequency domain mapping location and/or a time domain mapping location corresponding to one or more of the PSS, the SSS, and the PBCH in the SSB may be changed to distinguish between the first SSB and the second SSB. Therefore, the terminal device can distinguish between the first network type and the second network type in a frequency sweep stage, and further determine the access network.

With reference to the second aspect, in an embodiment of the second aspect, that the SSB is used by the terminal device to determine a network type includes: The SSB is used by the terminal device to: when the PSS successfully matches the first PSS, determine that the network type corresponding to the SSB is the first network type; or when the PSS successfully matches the second PSS, determine that the network type corresponding to the SSB is the second network type.

In the solution provided in this application, after receiving the one or more SSBs, the terminal device may perform blind detection on the PSS and the first PSS, or may perform blind detection on the PSS and the second PSS; and when the blind detection on the PSS and the first PSS succeeds, determine that the network type corresponding to the SSB is the first network type; or when the blind detection on the PSS and the second PSS succeeds, determine that the network type corresponding to the SSB is the second network type. It can be learned that the network type of the access network can be accurately identified in the frequency sweep stage based on different PSSs.

With reference to the second aspect, in an embodiment of the second aspect, that the SSB is used by the terminal device to determine a network type includes: The SSB is used by the terminal device to: when the SSS successfully matches the first SSS, determine that the network type corresponding to the SSB is the first network type; or when the SSS successfully matches the second SSS, determine that the network type corresponding to the SSB is the second network type.

In the solution provided in this application, after receiving the one or more SSBs, the terminal device may perform blind detection on the SSS and the first SSS, or may perform blind detection on the SSS and the second SSS; and when the blind detection on the SSS and the first SSS succeeds, determine that the network type corresponding to the SSB is the first network type; or when the blind detection on the SSS and the second SSS succeeds, determine that the network type corresponding to the SSB is the second network type. It can be learned that the network type of the access network can be accurately identified in the frequency sweep stage based on different SSSs.

With reference to the second aspect, in an embodiment of the second aspect, that the SSB is used by the terminal device to determine a network type includes: The SSB is used by the terminal device to: when the PBCH is descrambled by using the first pseudo-random sequence and the PBCH is successfully decoded, determine that the network type corresponding to the SSB is the first network type; or when the PBCH is descrambled by using the second pseudo-random sequence and the PBCH is successfully decoded, determine that the network type corresponding to the SSB is the second network type.

In the solution provided in this application, after receiving the one or more SSBs, the terminal device may descramble the PBCH by using the first pseudo-random sequence, or may descramble the PBCH by using the second PBCH; and when the PBCH is successfully descrambled by using the first pseudo-random sequence, determine that the network type corresponding to the SSB is the first network type; or when the PBCH is successfully descrambled by using the second pseudo-random sequence, determine that the network type corresponding to the SSB is the second network type. It can be learned that the network type of the access network can be accurately identified in the frequency sweep stage based on PBCH descrambling performed by using different pseudo-random sequences.

With reference to the second aspect, in an embodiment of the second aspect, that the SSB is used by the terminal device to determine a network type includes: The SSB is used by the terminal device to: when a frame structure of the SSB matches a frame structure of the first SSB, determine that the network type corresponding to the SSB is the first network type; or when a frame structure of the SSB matches a frame structure of the second SSB, determine that the network type corresponding to the SSB is the second network type, where the frame structure of the SSB includes frequency domain mapping locations and time domain mapping locations corresponding to the PSS, the SSS, and the PBCH in the SSB.

In the solution provided in this application, after receiving the one or more SSBs, the terminal device may perform matching between the frame structure of the first SSB and the frame structure of the SSB, or may perform matching between the frame structure of the second SSB and the frame structure of the SSB; and when the frame structure of the SSB matches the frame structure of the first SSB, determine that the network type corresponding to the SSB is the first network type; or when the frame structure of the SSB matches the frame structure of the second SSB, determine that the network type corresponding to the SSB is the second network type. It can be learned that the network type of the access network can be accurately identified in the frequency sweep stage based on different frame structures matching the SSB.

With reference to the second aspect, in an embodiment of the second aspect, the first network type is new radio NR, and the second network type is a non-terrestrial network NTN.

According to a third aspect, a communication apparatus is provided. The communication apparatus may be a terminal device, or may be a module (for example, a chip) in a terminal device. The communication apparatus includes:

a transceiver unit, configured to receive one or more SSBs; and a processing unit, configured to determine, based on a first SSB and/or a second SSB, a network type corresponding to the one or more SSBs, where the processing unit is further configured to determine an access network based on the network type.

With reference to the third aspect, in an embodiment of the third aspect, the SSB includes a PSS, and that the processing unit determines, based on a first SSB and/or a second SSB, a network type corresponding to the one or more SSBs includes:

when the PSS successfully matches a first PSS, determining that the network type corresponding to the SSB is a first network type, where the first PSS is a PSS in the first SSB; and/or when the PSS successfully matches a second PSS, determining that the network type corresponding to the SSB is a second network type, where the second PSS is a PSS in the second SSB.

With reference to the third aspect, in an embodiment of the third aspect, the SSB includes an SSS, and that the processing unit determines, based on a first SSB and/or a second SSB, a network type corresponding to the one or more SSBs includes:

when the SSS successfully matches a first SSS, determining that the network type corresponding to the SSB is a first network type, where the first SSS is an SSS in the first SSB; and/or when the SSS successfully matches a second SSS, determining that the network type corresponding to the SSB is a second network type, where the second SSS is an SSS in the second SSB.

With reference to the third aspect, in an embodiment of the third aspect, the SSB includes a PBCH, and that the processing unit determines, based on a first SSB and/or a second SSB, a network type corresponding to the one or more SSBs includes:

when the PBCH is successfully descrambled by using a first pseudo-random sequence, determining that the network type corresponding to the SSB is a first network type; and/or when the PBCH is successfully descrambled by using a second pseudo-random sequence, determining that the network type corresponding to the SSB is a second network type.

With reference to the third aspect, in an embodiment of the third aspect, that the processing unit determines, based on a first SSB and/or a second SSB, a network type corresponding to the one or more SSBs includes:

when a frame structure of the SSB matches a frame structure of the first SSB, determining that the network type corresponding to the SSB is a first network type; and/or when a frame structure of the SSB matches a frame structure of the second SSB, determining that the network type corresponding to the SSB is a second network type, where the frame structure of the SSB includes frequency domain mapping locations and time domain mapping locations corresponding to a PSS, an SSS, and a PBCH in the SSB.

With reference to the third aspect, in an embodiment of the third aspect, the first network type is new radio NR, and the second network type is a non-terrestrial network NTN.

With reference to the third aspect, in an embodiment of the third aspect, a sequence of the second PSS and a sequence of the first PSS meet a frequency domain mapping relationship; and/or a sequence of the second PSS is obtained by interleaving a sequence of the first PSS; and/or a cyclic shift value and/or a primitive polynomial of the second PSS are or is different from a cyclic shift value and/or a primitive polynomial of the first PSS.

With reference to the third aspect, in an embodiment of the third aspect, numbers of the sequence, of the second PSS, that is obtained by mapping the sequence of the first PSS in frequency domain are as follows:

[119 87 55 23 123 91 59 27 125 93 61 29 121 89 57 25 96 64 32 101 69 37 5 99 67 35 3 113 81 49 17 117 85 53 21 114 82 50 18 118 86 54 22 115 83 51 19 98 66 34 2 126 94 62 30 110 78 46 14 97 65 33 1 109 77 45 13 107 75 43 11 104 72 40 8 100 68 36 4 108 76 44 12 102 70 38 6 112 80 48 16 127 95 63 31 116 84 52 20 103 71 39 7 111 79 47 15 124 92 60 28 120 88 56 24 122 90 58 26 106 74 42 10 105 73 41 9].

With reference to the third aspect, in an embodiment of the third aspect, a sequence of the SSS is determined based on a cell parameter identifier ID, and a cell parameter identifier ID for determining a sequence of the second SSS is different from a cell parameter identifier ID for determining a sequence of the first SSS.

With reference to the third aspect, in an embodiment of the third aspect, the first pseudo-random sequence is used to descramble a first PBCH, the second pseudo-random sequence is used to descramble a second PBCH, the first PBCH is a PBCH in the first SSB, the second PBCH is a PBCH in the second SSB, and an initial value for determining the first pseudo-random code is different from an initial value for determining the second pseudo-random code.

With reference to the third aspect, in an embodiment of the third aspect, that a sequence of the second PSS is obtained by interleaving a sequence of the first PSS includes:

adding 0 to an end of the sequence of the first PSS to obtain a sequence, where the sequence is a sequence of 2 to a power of N, and N is an integer greater than or equal to 0;

mapping the sequence to a matrix block in order of rows to obtain a first matrix, where the matrix block is a $2^J \times 2^K$ matrix block, J is an integer greater than or equal to 0, K is an integer greater than or equal to 0, and N is equal to a sum of J and K;

performing column permutation on the first matrix to obtain a second matrix; and reading data of the second matrix by column to obtain the sequence of the second PSS.

With reference to the third aspect, in an embodiment of the third aspect, a frequency domain mapping location and/or a time domain mapping location corresponding to one or more of a PSS, an SSS, and a PBCH in the first SSB are or is different from a frequency domain mapping location and/or a time domain mapping location corresponding to one or more of a PSS, an SSS, and a PBCH in the second SSB.

According to a fourth aspect, a communication apparatus is provided. The communication apparatus may be a network device, or may be a module (for example, a chip) in a network device. The communication apparatus includes:

a processing unit, configured to determine an SSB; and a transceiver unit, configured to send the SSB to a terminal device, where the SSB is a first SSB or a second SSB, the first SSB and the second SSB correspond to different network types, and the SSB is used by the terminal device to determine a network type.

With reference to the fourth aspect, in an embodiment of the fourth aspect, the SSB includes a PSS, a PSS in the first SSB is a first PSS, and a PSS in the second SSB is a second PSS; and

11 a sequence of the second PSS and a sequence of the first PSS meet a frequency domain mapping relationship; and/or a sequence of the second PSS is obtained by interleaving a sequence of the first PSS; and/or a cyclic shift value and/or a primitive polynomial of the second PSS are or is different from a cyclic shift value and/or a primitive polynomial of the first PSS.

With reference to the fourth aspect, in an embodiment of the fourth aspect, numbers of the sequence, of the second PSS, that is obtained by mapping the sequence of the first PSS in frequency domain are as follows:

[119 87 55 23 123 91 59 27 125 93 61 29 121 89 57 25 96 64 32 101 69 37 5 99 67 35 3 113 81 49 17 117 85 53 21 114 82 50 18 118 86 54 22 115 83 51 19 98 66 34 2 126 94 62 30 110 78 46 14 97 65 33 1 109 77 45 13 107 75 43 11 104 72 40 8 100 68 36 4 108 76 44 12 102 70 38 6 112 80 48 16 127 95 63 31 116 84 52 20 103 71 39 7 111 79 47 15 124 92 60 28 120 88 56 24 122 90 58 26 106 74 42 10 105 73 41 9].

With reference to the fourth aspect, in an embodiment of the fourth aspect, the SSB includes an SSS, a sequence of the SSS is determined based on a cell parameter identifier ID, an SSS in the first SSB is a first SSS, an SSS in the second SSB is a second SSS, and a cell parameter identifier ID for determining a sequence of the second SSS is different from a cell parameter identifier ID for determining a sequence of the first SSS.

With reference to the fourth aspect, in an embodiment of the fourth aspect, the SSB includes a PBCH, a PBCH in the first SSB is a first PBCH, a PBCH in the second SSB is a second PBCH, an initial value for determining the first PBCH is different from an initial value for determining the second PBCH, the initial value is used to determine a pseudo-random sequence, and the pseudo-random sequence is used to scramble the PBCH.

With reference to the fourth aspect, in an embodiment of the fourth aspect, that a sequence of the second PSS is obtained by interleaving a sequence of the first PSS includes:

adding 0 to an end of the sequence of the first PSS to obtain a sequence, where the sequence is a sequence of 2 to a power of N, and N is an integer greater than or equal to 0;

mapping the sequence to a matrix block in order of rows to obtain a first matrix, where the matrix block is a $2^J \times 2^K$ matrix block, J is an integer greater than or equal to 0, K is an integer greater than or equal to 0, and N is equal to a sum of J and K;

performing column permutation on the first matrix to obtain a second matrix; and reading data of the second matrix by column to obtain the sequence of the second PSS.

With reference to the fourth aspect, in an embodiment of the fourth aspect, a frequency domain mapping location and/or a time domain mapping location corresponding to one or more of a PSS, an SSS, and a PBCH in the first SSB are or is different from a frequency domain mapping location and/or a time domain mapping location corresponding to one or more of a PSS, an SSS, and a PBCH in the second SSB.

With reference to the fourth aspect, in an embodiment of the fourth aspect, that the SSB is used by the terminal device to determine a network type includes:

The SSB is used by the terminal device to: when the PSS successfully matches the first PSS, determine that the network type corresponding to the SSB is a first network type; or when the PSS successfully matches the second PSS, determine that the network type corresponding to the SSB is a second network type.

With reference to the fourth aspect, in an embodiment of the fourth aspect, that the SSB is used by the terminal device to determine a network type includes:

The SSB is used by the terminal device to: when the SSS successfully matches the first SSS, determine that the network type corresponding to the SSB is a first network type; or when the SSS successfully matches the second SSS, determine that the network type corresponding to the SSB is a second network type.

With reference to the fourth aspect, in an embodiment of the fourth aspect, that the SSB is used by the terminal device to determine a network type includes:

The SSB is used by the terminal device to: when the PBCH is descrambled by using the first pseudo-random sequence and the PBCH is successfully decoded, determine that the network type corresponding to the SSB is a first network type; or when the PBCH is descrambled by using the second pseudo-random sequence and the PBCH is successfully decoded, determine that the network type corresponding to the SSB is a second network type.

With reference to the fourth aspect, in an embodiment of the fourth aspect, that the SSB is used by the terminal device to determine a network type includes:

The SSB is used by the terminal device to: when a frame structure of the SSB matches a frame structure of the first SSB, determine that the network type corresponding to the SSB is a first network type; or when a frame structure of the SSB matches a frame structure of the second SSB, determine that the network type corresponding to the SSB is a second network type, where the frame structure of the SSB includes frequency domain mapping locations and time domain mapping locations corresponding to the PSS, the SSS, and the PBCH in the SSB.

With reference to the fourth aspect, in an embodiment of the fourth aspect, the first network type is new radio NR, and the second network type is a non-terrestrial network NTN.

According to a fifth aspect, a communication apparatus is provided. The communication apparatus may be a terminal device, or may be a module (for example, a chip) in a terminal device. The communication apparatus may include a processor, configured to execute a computer program. When the computer program is executed, the communication apparatus is enabled to perform the communication method provided in any one of the first aspect or the implementations of the first aspect.

With reference to the fifth aspect, in an embodiment of the fifth aspect, the communication apparatus may further include a memory, configured to store the computer program.

According to a sixth aspect, a communication apparatus is provided. The communication apparatus may be a network device, or may be a module (for example, a chip) in a network device. The communication apparatus may include a processor, configured to execute a computer program. When the computer program is executed, the communication apparatus is enabled to perform the communication method provided in any one of the second aspect or the implementations of the second aspect.

With reference to the sixth aspect, in an embodiment of the sixth aspect, the communication apparatus may further include a memory, configured to store the computer program.

According to a seventh aspect, a communication system is provided. The communication system includes the communication apparatus in the fifth aspect and the communication apparatus in the sixth aspect.

According to an eighth aspect, a computer-readable storage medium is provided. The computer-readable storage medium stores a computer program or computer instructions. When the computer program is run or the computer instructions are run, the communication methods provided in the foregoing aspects are implemented.

According to a ninth aspect, a computer program product including executable instructions is further provided. When the computer program product is run on user equipment, some or all of the operations of the method in any one of the first aspect or the possible implementations of the first aspect, or any one of the second aspect or the possible implementations of the second aspect are performed.

According to a tenth aspect, a chip system is provided. The chip system includes a processor, and may further include a memory, and is configured to implement the method in any one of the first aspect or the possible implementations of the first aspect, or any one of the second aspect or the possible implementations of the second aspect. The chip system may include a chip, or include a chip and another discrete device.

BRIEF DESCRIPTION OF DRAWINGS

To describe the technical solutions in embodiments of this application more clearly, the following briefly describes the accompanying drawings for embodiments. It is clear that the accompanying drawings in the following description show merely some embodiments of this application, and one of ordinary skilled in the art may still derive other drawings from these accompanying drawings without creative efforts.

FIG. 6 is a schematic flowchart of interleaving a sequence of a first PSS according to an embodiment of this application;

DESCRIPTION OF EMBODIMENTS

Figure 1:
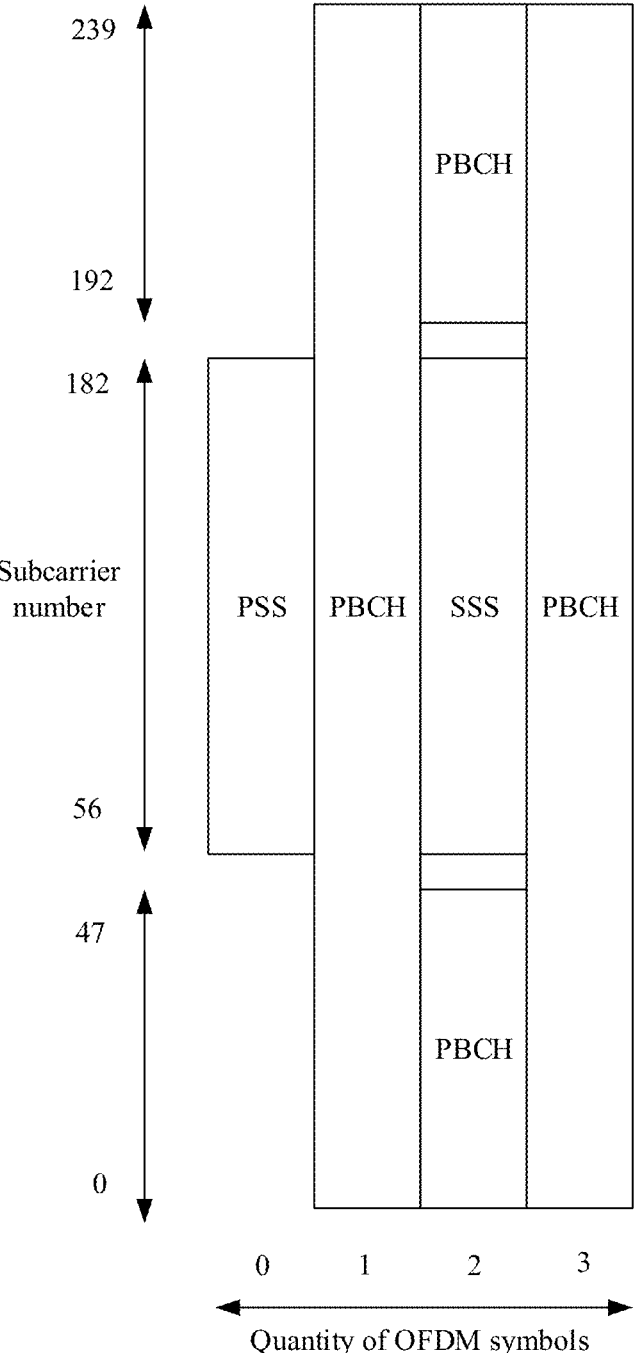
FIG. 1 is a schematic diagram of a time-frequency location of a synchronization signal block SSB according to an embodiment of this application.

The following clearly and completely describes technical solutions in embodiments of this application with reference to accompanying drawings. Clearly, described embodiments are merely some but not all of embodiments of this application. All other embodiments obtained by one of ordinary skilled in the art based on embodiments of this application without creative efforts shall fall within the protection scope of this application.

In the specification and accompanying drawings of this application, the terms "first", "second", and the like are intended to distinguish between different objects or distinguish between different processing of a same object, but do not indicate a particular order of the objects. In addition, the terms "including", "having", or any other variant thereof in descriptions of this application are intended to cover a non-exclusive inclusion. For example, a process, a method, a system, a product, or a device that includes a series of operations or units is not limited to the listed operations or units, but optionally further includes other unlisted operations or units, or optionally further includes other inherent operations or units of the process, the method, the product, or the device. It should be noted that, in embodiments of this application, the term such as "example" or "for example" is used to represent giving an example, an illustration, or descriptions. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a manner. In embodiments of this application, "A and/or B" represents two meanings: A and B, and A or B. "A, and/or B, and/or C" represents any one of A, B, and C, or represents any two of A, B, and C, or represents A, B, and C.

To better understand embodiments of this application, some terms and related technologies included in this application are explained and described first.

1. Frequency Sweep Differentiation in a Multimode Scenario

Currently, an increasing quantity of terminal devices can support a plurality of network types. For example, currently, an operator-free user on the market can support a plurality of network types such as a 3rd generation mobile network (3G), 4th generation mobile network time division duplex (4G TDD), 4th generation mobile network frequency division duplex 4G (4G FDD), and 5G. According to a current existing protocol of the 3GPP, a same frequency band and frequency may be used for different network types. For example, a frequency band 3 (BAND3) can support both 4G and 5G.

2. Satellite Communication

Non-terrestrial networks (NTN), such as a satellite communication system and high altitude platform station (HAPS) communication, have been a hot topic in the research field since the 1860s. Satellite communication is less affected by geographical conditions and can achieve an objective of global coverage. Therefore, development of the satellite communication is of great significance. Especially when local communication infrastructure is severely damaged and cannot perform normal communication due to a natural disaster, the satellite communication can provide strong communication assurance for effective disaster relief. In addition, in some regions not conducive to construction of terrestrial base stations, including oceans, deserts, mountains, and the like, effective communication can be performed through the satellite communication, thereby ensuring full coverage of communication.

Usually, a higher orbit of a satellite indicates a larger coverage area of the satellite, but also indicates a longer communication delay. Currently, satellite mobile communication systems may be classified into four types based on orbits (an elliptical orbit and a circular orbit) and altitudes (high, medium, and low) of satellite operation:

(1) a low earth orbit (LEO) satellite system, where an orbit altitude is 500 km to 2000 km;

(2) a medium earth orbit (MEO) satellite system, where an orbit altitude is 2000 km to 20000 km;

(3) a highly eccentric orbit (HEO) satellite system, which is a satellite system that has an elliptical orbit and that has a low perigee and a very high apogee, where an orbit altitude of the satellite system is greater than 20000 km; and (4) a geostationary earth orbit (GEO) satellite system, where an orbit altitude is 35800 km, and relative locations of a satellite operating on the orbit and the earth are not affected by the earth's rotation.

A satellite located on an LEO is close to the ground and has a short communication delay and a high data transmission rate, and a weight and a volume of a terminal device may be similar to those of a personal mobile device. The satellite is more suitable for popularization in the mass market, and has become a hot topic in current industry development.

By classifying satellite systems based on satellite processing capabilities, satellite communication systems may be classified into a transparent forwarding satellite system and a regenerative satellite system. A transparent forwarding satellite performs only transparent transmission and spectrum shifting on a signal, but does not process information. A regenerative satellite has a satellite signal processing capability, and the satellite can extract an original baseband signal, and perform routing and switching and system configuration by using information. Currently, the transparent forwarding satellite system and the regenerative satellite system coexist in development.

By classifying satellite systems based on whether a satellite beam moves along with a satellite, satellite communication systems may be classified into a non-staring satellite system and a staring satellite system. In the non-staring satellite system, a satellite beam moves along with a satellite, an angle of each beam of the satellite does not change with time from a perspective of the satellite, and a terrestrial fixed point undergoes frequent beam switching in a period in which the satellite passes the top of the point. In the staring satellite system, an angle of a beam of a satellite is adjusted in a manner, and the satellite can continuously observe a terrestrial fixed point by switching a beam angle.

In a satellite system other than the geostationary earth orbit satellite system, a satellite has a moving speed relative to the ground, and a lower orbit indicates a higher relative speed. A large Doppler frequency shift occurs due to a high relative moving speed between the satellite and a terminal. For example, for the LEO, on an orbit below 700 km, a Doppler range may reach −83.8 kHz to 83.8 kHz. A space above 120 km is selected for a satellite operation orbit due to impact of air resistance and other factors. When an elevation angle range of a user is a range of 10 to 170 degrees, a maximum Doppler frequency shift on an FR2 frequency band is 1.348 MHz (a normalized Doppler frequency shift is 5.61 when a subcarrier spacing (SCS) is 240 kHz, and a normalized Doppler frequency shift is 11.23 when an SCS is 120 kHz), and a maximum Doppler frequency shift on an FR1 frequency band is 153.8 kHz (a normalized Doppler frequency shift is 5.12 when an SCS is 30 kHz, and a normalized Doppler frequency shift is 10.25 when an SCS is 120 kHz). Compared with a terrestrial network, the NTN has a higher requirement for frequency offset resistance.

3. Table 7.4.3.1-1 in the 3GPP protocol TS 38.211 describes time domain mapping locations of a PSS, an SSS, and a PBCH in an SSB and a demodulation reference signal (DMRS) required for the PBCH. Table 7.4.3.1-1 indicates a location of a symbol occupied by the PSS and a frequency domain index location of the PSS in the SSB; further indicates a location of a symbol occupied by the SSS and a frequency domain index location of the SSS in the SSB; and further indicates locations of symbols occupied by the PBCH and the DMRS required for the PBCH, and frequency domain index locations of the PBCH and the DMRS required for the PBCH in the SSB.

FIG. 1 is a schematic diagram of a time-frequency location of an SSB according to an embodiment of this application. As shown in FIG. 1, in time domain, the SSB includes four orthogonal frequency division multiplexing (OFDM) symbols that are numbered in ascending order from 0 to 3 in the SSB. In frequency domain, the SSB includes 240 consecutive subcarriers, namely, 20 physical resource blocks (PRB), and subcarrier numbers increase in ascending order from 0 to 239.

A PSS, an SSS, a PBCH, and a DMRS related to the PBCH are mapped to symbols shown in the following table. For example, resources of the PSS, the SSS, and the PBCH in the SSB and the DMRS corresponding to the PBCH may be shown in Table 1.

TABLE 1

| Channel or signal | Quantity of OFDM symbols relative to the SSB | Quantity of subcarriers relative to the SSB |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47 |
|  |  | 192, 193, . . . , 239 |
| DMRS corresponding to the PBCH | 1, 3 | 0 + v, 4 + v, 8 + v, . . . , 236 + v |
|  | 2 | 0 + v, 4 + v, 8 + v, . . . , 44 + v |
|  |  | 192 + v, 196 + v, . . . , 236 + v |

As shown in Table 1, time/frequency domain location information of a PSS, an SSS, and a PBCH in each SSB may be as follows:

PSS: The PSS is at a location of the zeroth OFDM symbol in the SSB in time domain, and occupies 126 subcarriers from a subcarrier 56 to a subcarrier 182 in frequency domain.

SSS: The SSS is at a location of the second OFDM symbol in the SSB in time domain, and occupies 126 subcarriers from a subcarrier 56 to a subcarrier 182 in frequency domain.

PBCH: When occupying locations of the first and third OFDM symbols in the SSB, the PBCH occupies 240 subcarriers from the zeroth subcarrier to the 239th subcarrier in frequency domain. When occupying a location of the second symbol in the SSB, the PBCH occupies 96 subcarriers from the zeroth subcarrier to the 47th subcarrier and from the 192nd subcarrier to the 239th subcarrier in frequency domain.

The "Set to 0" in Table 1 indicates that, on the zeroth symbol in the SSB, the zeroth to the 55th and the 183rd to the 239th subcarriers serve as guard bands and cannot be used; and on the second symbol in the SSB, the 48th to the 55th and the 183rd to the 191st subcarriers serve as guard bands and cannot be used.

A frequency reuse manner is used between the PBCH and the DMRS corresponding to the PBCH. A calculation formula in Table 1 is as follows:

$$v = N_{ID}^{cell}$$

mod 4. Therefore, a location of the DMRS corresponding to the PBCH is related to a cell number.

On the first and third symbols in the SSB, the PBCH occupies 240 subcarriers, where there is one DMRS at an interval of four subcarriers, and a start location of the DMRS depends on a modulo result V between a cell number and 4. On symbol 2, in the case of different values of v, start and end locations and value ranges of corresponding subcarrier numbers are different, but location arrangement relationships of DMRS sequences are similar.

4. According to stipulation of the 3GPP, there are a total of 1008 cells, there are three PSS sequences, each sector has 336 SSS sequences, and three sectors have a total of 1008 SSS sequences.

In 7.4.2.2 of the 3GPP protocol 38.211, in a method for determining a PSS sequence, a seventh-order primitive polynomial may be used to equally divide a cyclic shift m sequence by using an initial value. Cyclic shift values are 0, 43, and 86.

In 7.4.2.3 of the 3GPP protocol 38.211, in a method for determining an SSS sequence, two seventh-order primitive polynomials are used to generate two cyclic shift sequences by using an initial value, cyclic shifts are performed on respective m sequences of the two cyclic shift sequences according to a method, and a product of two m sequences obtained through cyclic shifts is used as an NR SSS sequence.

Figure 2:
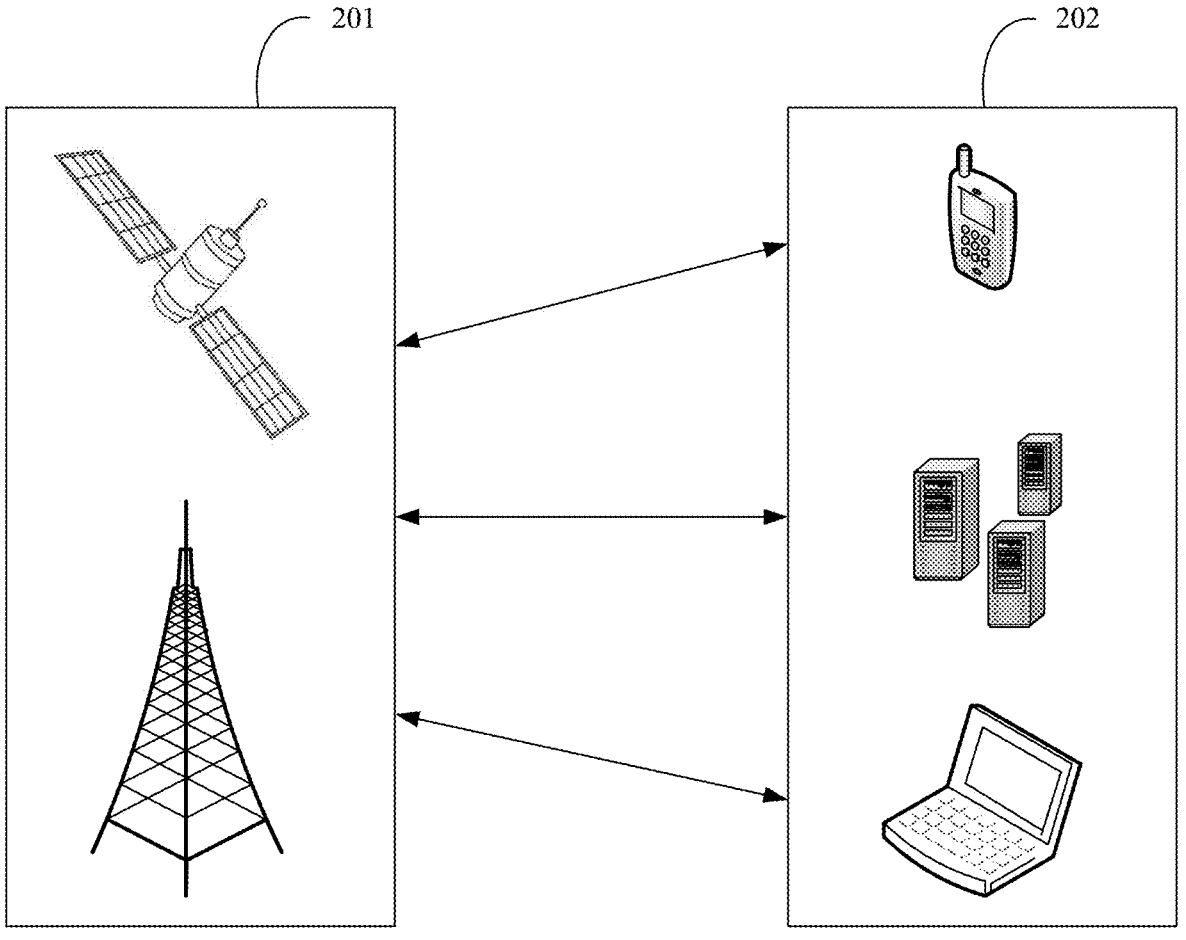
FIG. 2 is a schematic diagram of a network architecture according to an embodiment of this application.

To better understand a communication method and apparatus and a computer-readable storage medium that are provided in embodiments of this application, the following first describes a network architecture used in embodiments of this application. FIG. 2 is a schematic diagram of a network architecture according to an embodiment of this application. As shown in FIG. 2, the network architecture may include a network device 201 and a terminal device 202. The network device 201 may send an SSB to the terminal device 202. The SSB may be a first SSB or may be a second SSB. The first SSB and the second SSB correspond to different network types. After receiving one or more SSBs, the terminal device 202 may determine, based on the first SSB and the second SSB, a network type corresponding to the one or more SSBs, and then determine an access network based on the network type.

The network device 201 may be an apparatus for providing a communication service function for the terminal device 202. The network device 201 may transmit downlink data to the terminal device 202. The downlink data may be encoded through channel encoding. Downlink data obtained through channel encoding may be transmitted to the terminal device 202 after undergoing constellation modulation. The network device 201 includes but is not limited to a satellite, an aircraft, a hot air balloon, an aerial relay, or another apparatus with a transmission signal. The network device 201 may be an evolved NodeB (evolutional NodeB, eNB or eNodeB) in LTE, a base station in a 5G network or a future evolved public land mobile network (PLMN), a broadband network gateway (BNG), an aggregation switch, a non-3GPP access device, or the like. This is not specifically limited in an embodiment of the application. Optionally, the base station in an embodiment of the application may include base stations in various forms, for example, a macro base station, a micro base station (also referred to as a small cell), a relay station, an access point, a next-generation NodeB (gNB), a transmitting and receiving point (TRP), a transmitting point (transmitting point, TP), a mobile switching center, and a device that performs a function of a base station in device-to-device (D2D), vehicle-to-everything (V2X), or machine-to-machine (M2M) communication. This is not specifically limited in an embodiment of the application. For ease of description, in all the embodiments of this application, all the foregoing apparatuses that provide a wireless communication function for the terminal device are referred to as a network device.

The terminal device 202 may transmit uplink data to the network device 201. The uplink data may also be encoded through channel encoding. Uplink data obtained through channel encoding may be transmitted to the network device 201 after undergoing constellation modulation. The terminal device 202 may be referred to as a terminal, or may be referred to as a user, a satellite phone, a satellite terminal, a subscriber unit, a cellular phone, a smartphone, a smartwatch, a wireless data card, a personal digital assistant (PDA) computer, a tablet computer, a wireless modem, a handheld device (handset), a laptop computer, a machine type communication (MTC) terminal, or the like. The terminal device 202 may be a vehicle-mounted device or a wearable device, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a terminal device in a 5G network or a future communication network, or the like. This is not specifically limited in an embodiment of the application.

Figures 3, 4:
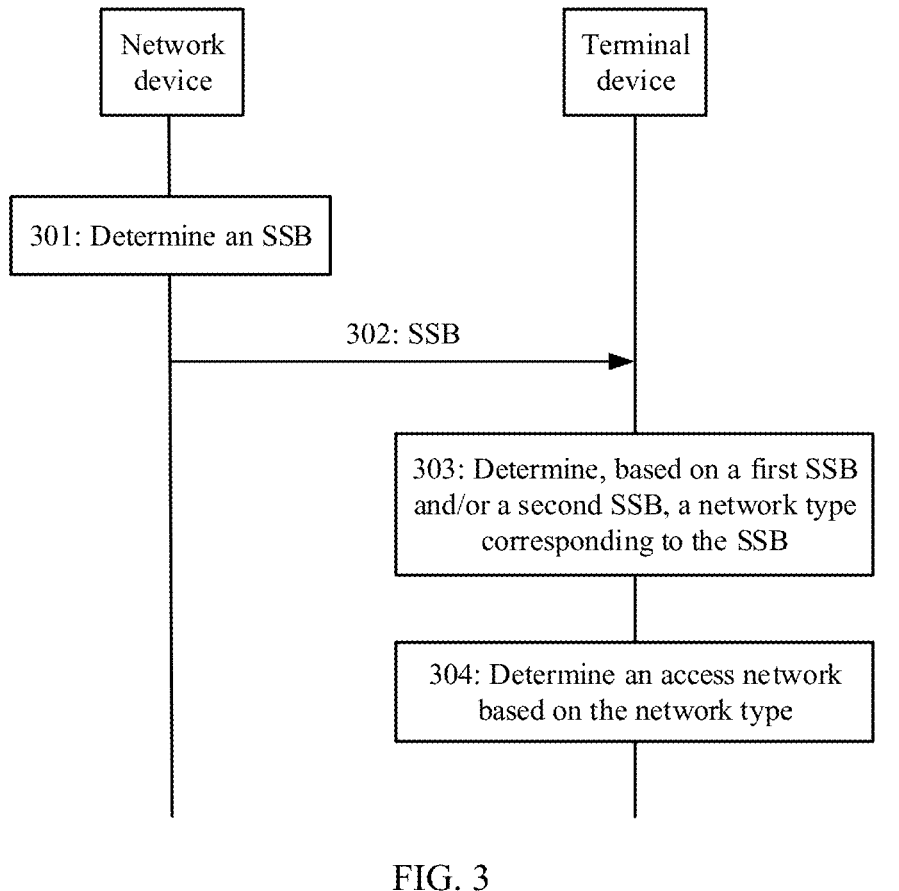
FIG. 3 is a schematic flowchart of a communication method according to an embodiment of this application.
FIG. 4 is a schematic flowchart of determining a sequence of a second PSS according to an embodiment of this application.

Based on the foregoing network architecture, FIG. 3 is a schematic flowchart of a communication method according to an embodiment of this application. A function performed by a network device in this application may be alternatively performed by a module (for example, a chip) in a network device, and a function performed by a terminal device in this application may be alternatively performed by a module (for example, a chip) in a terminal device. As shown in FIG. 3, the communication method may include the following operations.

301: A network device determines an SSB.

The network device may determine the SSB. The SSB may be a first SSB or may be a second SSB. The first SSB may be determined by the network device in real time, or may be stored by the network device after being determined by the network device once, or may be preset by the network device. The second SSB may be determined based on the first SSB, or may be newly determined. The first SSB and the second SSB may correspond to different network types.

The SSB may include a PSS, an SSS, and a PBCH. A first PSS, a first SSS, and a first PBCH may be a PSS, an SSS, and a PBCH in the first SSB. A second PSS, a second SSS, and a second PBCH may be a PSS, an SSS, and a PBCH in the second SSB. An initial value may be used to determine a pseudo-random sequence, and the pseudo-random sequence may scramble and descramble the PBCH.

In an embodiment, the first PSS may be different from the second PSS, and therefore the first SSB is different from the second SSB. In another implementation, the first SSS may be different from the second SSS, and therefore the first SSB is different from the second SSB. In an embodiment, an initial value for determining the first PBCH may be different from an initial value for determining the second PBCH, and therefore the first SSB is different from the second SSB. In an embodiment, a frame structure of the first SSB may be different from a frame structure of the second SSB, and therefore the first SSB is different from the second SSB.

302: The network device sends the SSB to a terminal device.

After determining the SSB, the network device may send the determined SSB to the terminal device. Correspondingly, the terminal device may receive the SSB from the network device.

303: The terminal device determines, based on the first SSB and/or the second SSB, a network type corresponding to the SSB.

After receiving the SSB from the network device, the terminal device may determine the network type based on the first SSB and/or the second SSB.

It should be noted that the first SSB and the second SSB may be determined by the terminal device in real time, may be stored by the terminal device after being determined by the terminal device once, or may be preset by the terminal device. A manner of determining the first SSB and the second SSB by the terminal device may be the same as a manner of determining the first SSB and the second SSB by the network device.

In the case in which the first PSS may be different from the second PSS, and therefore the first SSB is different from the second SSB, details are as follows:

Based on sequence correlation and/or sequence cross-correlation, the terminal device may perform blind detection on a sequence of the PSS in the received SSB by using a sequence of the first PSS, or may perform blind detection on a sequence of the PSS in the received SSB by using a sequence of the second PSS, or perform blind detection on a sequence of the PSS in the received SSB by using a sequence of the first PSS and a sequence of the second PSS; and when the blind detection on the sequence of the first PSS and the sequence of the received PSS succeeds, may determine that the network type corresponding to the received SSB is a first network type; or when the blind detection on the sequence of the second PSS and the sequence of the received PSS succeeds, may determine that the network type corresponding to the received SSB is a second network type. A network type corresponding to the first SSB is the first network type. A network type corresponding to the second SSB is the second network type.

In an embodiment, the first network type may be NR, and the second network type may be an NTN. The first network type and the second network type are also applicable to adaptation to 5G and 6G. It should be understood that names of all network types in this application are merely examples. In future communication, for example, in 6G, the network types may be alternatively referred to as other names. This is not limited in this application. This is collectively described herein, and details are not described again subsequently.

In an embodiment of the application, the method in which implicit indication can be performed through blind detection on the sequence of the second PSS and the sequence of the first PSS may be used for indication of NR and the NTN. The method may be further used for indication of another function, for example, antenna polarization indication, cell ID parameter $$\left(N_{ID}^{(1)} \text{ and } N_{ID}^{(2)}\right)$$

indication, Doppler pre-compensation or post-compensation indication, satellite type indication, regenerative or transparent forwarding indication, hybrid automatic repeat request (Hybrid Automatic Repeat Request, HARQ) off indication, or staring or non-staring indication.

In an embodiment, when determining, based on the first SSB and/or the second SSB, that the network type corresponding to the received SSB is NR or the NTN, the terminal device may preferentially use a terrestrial network, and first detect a sequence of a PSS in NR (the sequence of the first PSS). This can reduce complexity of detection.

In the case in which the first SSS may be different from the second SSS, and therefore the first SSB is different from the second SSB, details are as follows:

Based on sequence correlation and/or sequence cross-correlation, the terminal device may perform blind detection on a sequence of the SSS in the received SSB by using a sequence of the first SSS, or may perform blind detection on a sequence of the SSS in the received SSB by using a sequence of the second SSS, or perform blind detection on a sequence of the SSS in the received SSB by using a sequence of the first SSS and a sequence of the second SSS; and when the blind detection on the sequence of the first SSS and the sequence of the received SSS succeeds, may determine that the network type corresponding to the received SSB is a first network type; or when the blind detection on the sequence of the second SSS and the sequence of the received SSS succeeds, may determine that the network type corresponding to the received SSB is a second network type.

In the case in which the initial value for determining the first PBCH may be different from the initial value for determining the second PBCH, and therefore the first SSB is different from the second SSB, details are as follows:

The terminal device may descramble the PBCH in the received SSB by using a first pseudo-random sequence, or may descramble the PBCH in the received SSB by using a second pseudo-random sequence, or may descramble the PBCH in the received SSB by using a first pseudo-random sequence and a second pseudo-random sequence; and when the received PBCH is descrambled by using the first pseudo-random sequence and the PBCH is successfully decoded, may determine that the network type corresponding to the received SSB is a first network type; or when the received PBCH is descrambled by using the second pseudo-random sequence and the PBCH is successfully decoded, may determine that the network type corresponding to the received SSB is a second network type.

In the case in which the frame structure of the first SSB may be different from the frame structure of the second SSB, and therefore the first SSB is different from the second SSB, details are as follows:

The terminal device may compare the frame structure of the first SSB with a frame structure of the received SSB, or may compare the frame structure of the second SSB with a frame structure of the received SSB, or may compare the frame structure of the first SSB and the frame structure of the second SSB with a frame structure of the received SSB; and when the frame structure of the first SSB matches the frame structure of the received SSB, may determine that the network type corresponding to the received SSB is a first network type; or when the frame structure of the second SSB matches the frame structure of the received SSB, may determine that the network type corresponding to the received SSB is a second network type. For example, the frame structure of the second SSB is different from the frame structure of the first SSB, and a frequency domain location of the PSS in the second SSB changes. In this case, after detecting the frequency domain location occupied by the PSS in the second SSB, the terminal device correspondingly changes a direction for detecting a frequency domain location of the SSS in the second SSB, for example, detects the SSS in a forward or backward direction or at an interval of two or three subcarriers.

304: The terminal device determines an access network based on the network type.

After determining the network type corresponding to the received SSB, the terminal device may determine the access network, so that the terminal device can communicate with the network device. In an embodiment, the terminal device determines that the network type corresponding to the received SSB is the first network type, and therefore accesses a first network to communicate with the network device; or the terminal device determines that the network type corresponding to the received SSB is the second network type, and therefore accesses a second network to communicate with the network device.

Based on the foregoing operation, in the case in which the first PSS may be different from the second PSS, and therefore the first SSB is different from the second SSB, details are as follows:

The sequence of the first PSS may be re-mapped in frequency domain based on the sequence of the first PSS, so that the second PSS is different from the first PSS; or the sequence of the first PSS may be interleaved based on the sequence of the first PSS to obtain the sequence of the second PSS, so that the second PSS is different from the first PSS; or the sequence of the second PSS may be determined based on a cyclic shift value and/or a primitive polynomial that are different from those of the sequence of the first PSS, without being based on the sequence of the first PSS, so that the second PSS is different from the first PSS. The second PSS is different from the first PSS, and therefore the first SSB is different from the second SSB. The terminal device can distinguish between the first network type and the second network type by performing blind detection on the sequence of the first PSS and the sequence of the second PSS through frequency sweeping, and further determine the access network.

FIG. 4 is a schematic flowchart of determining a sequence of a second PSS according to an embodiment of this application. As shown in FIG. 4, the sequence of the second PSS may be determined based on a sequence of a first PSS.

In an embodiment, the sequence of the second PSS and the sequence of the first PSS may meet a frequency domain mapping relationship. The sequence of the second PSS may be obtained by re-mapping the sequence of the first PSS to a frequency domain location.

Figure 5:
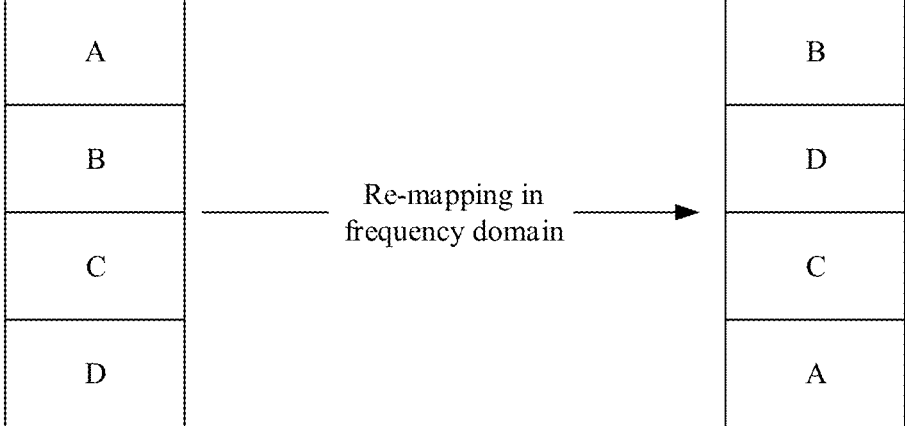
FIG. 5 is a schematic diagram of a structure of re-mapping a sequence of a first PSS in frequency domain according to an embodiment of this application.

FIG. 5 is a schematic diagram of a structure of re-mapping a sequence of a first PSS in frequency domain according to an embodiment of this application. As shown in FIG. 5, the sequence of the first PSS may be A, B, C, D. A sequence, of a second PSS, that is obtained by re-mapping the sequence of the first PSS in frequency domain is B, D, C, A.

In an embodiment, it is assumed that numbers of the sequence of the first PSS are 1, 2, 3, . . . , and 127, and are continuously mapped to frequency domain locations. Data corresponding to the numbers of the sequence of the first PSS may be re-mapped in frequency domain, to map data of the number 119 in the sequence to a carrier 1, map data of the number 87 in the sequence to a carrier 2, map data of the number 55 in the sequence to a carrier 3, and so on. Therefore, numbers of the sequence, of the second PSS, that is obtained through re-mapping in frequency domain may be as follows:

[119 87 55 23 123 91 59 27 125 93 61 29 121 89 57 25
96 64 32 101 69 37 5 99 67 35 3 113 81 49 17 117 85
53 21 114 82 50 18 118 86 54 22 115 83 51 19 98 66
34 2 126 94 62 30 110 78 46 14 97 65 33 1 109 77 45
13 107 75 43 11 104 72 40 8 100 68 36 4 108 76 44 12
102 70 38 6 112 80 48 16 127 95 63 31 116 84 52 20
103 71 39 7 111 79 47 15 124 92 60 28 120 88 56 24
122 90 58 26 106 74 42 10 105 73 41 9].

The sequence of the first PSS is re-mapped in frequency domain in this order, so that cross-correlation between sequences of the second PSS and between the sequence of the second PSS and the sequence of the first PSS can be reduced.

In an embodiment, alternatively, data corresponding to the numbers of the sequence of the first PSS may be re-mapped in frequency domain, to map data of the number 29 in the sequence to a carrier 1, map data of the number 61 in the sequence to a carrier 2, map data of the number 93 in the sequence to a carrier 3, and so on. Therefore, numbers of the sequence, of the second PSS, that is obtained through re-mapping in frequency domain may be as follows:

[29 61 93 125 12 44 76 108 14 46 78 110 10 42 74 106
20 52 84 116 23 55 87 119 21 53 85 117 18 50 82 114
28 60 92 124 22 54 86 118 2 34 66 98 17 49 81 113 31
63 95 127 30 62 94 126 27 59 91 123 3 35 67 99 26 58
90 12 2 8 40 72 104 4 36 68 100 15 47 79 111 6 38 70
102 24 56 88 120 19 51 83 115 7 39 71 103 11 43 75
10 7 5 37 69 101 1 33 65 97 32 64 96 13 45 77 109 9
41 73 105 16 48 80 112 25 57 89 121].

The sequence of the first PSS is re-mapped in frequency domain in this order, so that cross-correlation between sequences of the second PSS and between the sequence of the second PSS and the sequence of the first PSS can be reduced.

In an embodiment, alternatively, data corresponding to the numbers of the sequence of the first PSS may be re-mapped in frequency domain, to map data of the number 102 in the sequence to a carrier 1, map data of the number 70 in the sequence to a carrier 2, map data of the number 38 in the sequence to a carrier 3, and so on. Therefore, numbers of the sequence, of the second PSS, that is obtained through re-mapping in frequency domain may be as follows:

[102 70 38 6 104 72 40 8 105 73 41 9 122 90 58 26 114
82 50 18 111 79 47 15 115 83 51 19 126 94 62 30 127
95 63 31 112 80 48 16 125 93 61 29 124 92 60 28 113
81 49 17 99 67 35 3 101 69 37 5 97 65 33 1 121 89 57
25 100 68 36 4 107 75 43 11 109 77 45 13 120 88 56
24 96 64 32 106 74 42 10 117 85 53 21 123 91 59 27
119 87 55 23 116 84 52 20 98 66 34 2 110 78 46 14 118
86 54 22 103 71 39 7 108 76 44 12].

The sequence of the first PSS is re-mapped in frequency domain in this order, so that cross-correlation between sequences of the second PSS and between the sequence of the second PSS and the sequence of the first PSS can be reduced.

In an embodiment, the sequence of the second PSS may be obtained by interleaving the sequence of the first PSS. For example, 0 may be first added to an end of the sequence of the first PSS to obtain a sequence of 2 to a power of N, where N is an integer greater than or equal to 0; the sequence is mapped to a $2^J \times 2^K$ matrix block in order of rows to obtain a first matrix, where J is an integer greater than or equal to 0, K is an integer greater than or equal to 0, and N is equal to a sum of J and K; column permutation is performed on the first matrix to obtain a second matrix; and then data of the second matrix may be read by column to obtain the sequence of the second PSS.

In an embodiment, refer to FIG. 6. FIG. 6 is a schematic flowchart of interleaving a sequence of a first PSS according to an embodiment of this application. As shown in FIG. 6:

Operation 1: First, 0 may be added to an end of a 127-point sequence of a first PSS to obtain a 128-point sequence SEQ1.

Operation 2: Map the sequence SEQ1 to a 4×32 matrix block to obtain a first matrix, where a mapping order may be as follows: first mapping the $1^{st}$ row, and then mapping the $2^{nd}$, $3^{rd}$, and $4^{th}$ rows in sequence.

Operation 3: Perform column permutation on the first matrix in an order to obtain a second matrix, and perform data collection on data of the second matrix in an order of the $1^{st}$ column, the $2^{nd}$ column, . . . , and the $32^{nd}$ column, where "0" data that is originally obtained by adding 0 needs to be punctured, a collected sequence is a sequence of a second PSS, and a frequency domain mapping location and order of the sequence of the second PSS in the SSB may be the same as those of the sequence of the first PSS.

When column permutation is performed on the first matrix to obtain the second matrix, for example, assuming that columns of the first matrix are arranged according to 1, 2, 3, . . . , 32, data in the $1^{st}$ column of the first matrix may be arranged in the $5^{th}$ column of the second matrix, data in the $2^{nd}$ column of the first matrix may be arranged in the $24^{th}$ column of the second matrix, data in the $3^{rd}$ column of the first matrix may be arranged in the $14^{th}$ column of the second matrix, and so on. Therefore, an order of columns of the second matrix obtained through column permutation may be as follows: [10 6 4 8 1 28 30 16 12 15 11 14 31 3 19 32 20 22 25 29 21 27 17 2 13 26 18 5 9 7 23 24]. Column permutation is performed in this order, so that correlation between the sequence of the first PSS and the sequence of the second PSS can be improved.

Alternatively, an order of columns of the second matrix obtained through column permutation may be as follows: [29 12 14 10 20 23 21 18 28 22 2 17 31 30 27 3 26 8 4 15 6 24 19 7 11 5 1 32 13 9 16 25]. Column permutation is performed in this order, so that correlation between the sequence of the first PSS and the sequence of the second PSS can be improved.

Alternatively, an order of columns of the second matrix obtained through column permutation may be as follows: [27 25 24 7 15 18 14 3 2 17 4 5 16 30 28 32 8 29 22 20 9 1 23 12 6 10 13 31 19 11 26 21]. Column permutation is performed in this order, so that correlation between the sequence of the first PSS and the sequence of the second PSS can be improved.

In an embodiment, the sequence of the second PSS may be alternatively newly determined. In an embodiment, a cyclic shift value and/or a primitive polynomial of the second PSS may be different from a cyclic shift value and/or a primitive polynomial of the first PSS. In 7.4.2.2 of the 3GPP protocol 38.211, in a method for determining a PSS sequence, a PSS sequence is defined as an m sequence. The m sequence is a special linear feedback shift register (LFSR) sequence.

Figure 7:
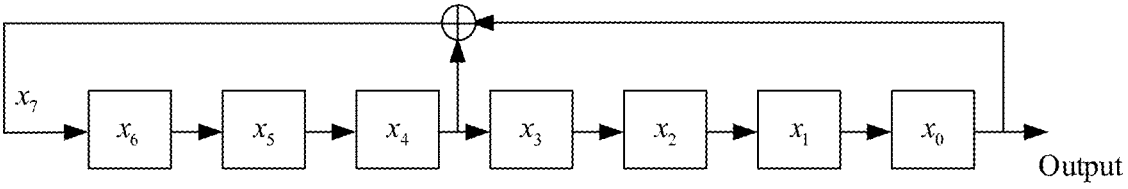
FIG. 7 is a diagram of a structure of determining an m sequence according to an embodiment of this application.

FIG. 7 is a diagram of a structure of determining an m sequence according to an embodiment of this application. As shown in FIG. 7, a sequence of a first PSS may be determined by using a seventh-order primitive polynomial, and a cyclic shift m sequence is equally divided by using an initial value. Cyclic shift values of the first PSS may be (0 43 86). A primitive polynomial of the first PSS is $D^7+D^4+1$.

Correspondingly, a formula for determining the sequence of the first PSS is as follows:

$$d_{pss1}(n)=1-2x(m_1)$$

$$m_1 = \left(n + 43N_{ID}^{(2)}\right) \bmod 127,$$

where $$0 \le n < 127$$

$x(i+7)=(x(i+4)+x(i)) \bmod 2$, mod indicates a modulo operation, and $$[x(6)x(5)x(4)x(3)x(2)x(1)x(0)]=[1110110]$$

A value range of n is $0 \le n < 127$. Therefore, it can be learned that a length of the sequence of the first PSS is 127. A value of $d_{pss1}(n)$ is determined by $x(m_1)$, and $$N_{ID}^{(2)}$$

has three values. Therefore, there are three $m_1$ values corresponding to each $0 \le n < 127$, and $d_{pss1}(n)$ finally has three values, that is, the first PSS has three sequences.

An offset may be added to the cyclic shift values (0 43 86). A value of the offset may be 21, or a value of the offset may be 22. Therefore, cyclic shift values of the second PSS that are obtained may be (0 21 43 86) or (0 22 43 86).

A formula for determining the sequence of the second PSS may be as follows:

$$d_{pss2}(n)=1-2x(m_2)$$

$$m_2 = \left(n + 43N_{ID}^{(2)} + 21\right) \bmod 127 \text{ or } m_2 = \left(n + 43N_{ID}^{(2)} + 22\right) \bmod 127,$$

where $$0 \le n < 127$$

$x(i+7)=(x(i+4+x(i)) \bmod 2$, and $$[x(6)x(5)x(4)x(3)x(2)x(1)x(0)]=[1110110]$$

Therefore, if the cyclic shift values vary, the sequence of the first PSS is different from the sequence of the second PSS, and the first SSB is different from the second SSB. The value of the offset is 21 or 22. Compared with another value of the offset, this can improve a frequency offset resistance capability of the m sequence.

A primitive polynomial of the second PSS may be $D^7+D+1$, $D^7+D^3+1$, or $D^7+D^6+1$. A formula for determining the sequence of the second PSS may be as follows:

$$d_{pss2}(n)=1-2x(m_2)$$

$$m_2 = \left(n + 43N_{ID}^{(2)}\right)\bmod 127,$$

where $$0 \leq n < 127$$

$$x(i+7)=(x(i++x(i))\bmod 2, \text{ and}$$

$$[x(6)x(5)x(4)x(3)x(2)x(1)x(0)]=[1111100]; \text{ or}$$

$$x(i+7)=(x(i+3)+x(i))\bmod 2, \text{ and}$$

$$[x(6)x(5)x(4)x(3)x(2)x(1)x(0)]=[1111010]; \text{ or}$$

$$x(i+7)=(x(i+6)+x(i))\bmod 2, \text{ and}$$

$$[x(6)x(5)x(4)x(3)x(2)x(1)x(0)]=[1011110].$$

Therefore, if the primitive polynomial varies, the sequence of the first PSS is different from the sequence of the second PSS, and the first SSB is different from the second SSB. The primitive polynomial of the second PSS is $D^7+D+1$, $D^7+D^3+1$, or $D^7+D^6+1$. Compared with another primitive polynomial, this reduces calculation complexity, and cross-correlation of the m sequence is low, so that the sequence of the first PSS can be better distinguished from the sequence of the second PSS.

Therefore, the sequence of the second PSS may be determined by re-mapping the sequence of the first PSS in frequency domain, or by interleaving the sequence of the first PSS, or based on different cyclic shift values and primitive polynomials, so that the first PSS can be different from the second PSS, and therefore the first SSB is different from the second SSB. The terminal device can distinguish between the first network type and the second network type by performing blind detection on the sequence of the first PSS and the sequence of the second PSS through frequency sweeping, and further determine the access network.

Based on the foregoing operation, in the case in which the first SSS may be different from the second SSS, and therefore the first SSB is different from the second SSB, details are as follows:

1008 physical cell IDs are defined in 5G. A value range is 0 to 1007, and may be expressed by using a formula:

$$N_{ID}^{(cell)} = 3N_{ID}^{(1)} + N_{ID}^{(2)},$$

where $$N_{ID}^{(1)} \in \{0, 1, \dots\}, N_{ID}^{(2)} \in \{0, 1, 2\}, \text{ and } N_{ID}^{(2)} \text{ and } N_{ID}^{(1)}$$

may be used to determine a cell ID.

The terminal device may obtain $$N_{ID}^{(2)} \text{ and } N_{ID}^{(1)}$$

in the foregoing formula by detecting a sequence of a PSS and a sequence of an SSS. For example, the sequence $d_{pss}(n)$ of the PSS is defined as follows (refer to 38.211-7.4.2.2.1):

$$d_{pss}(n)=1-2x(m)$$

$$m = \left(n + 43N_{ID}^{(2)}\right)\bmod 127,$$

where $$0 \leq n < 127$$

$$x(i+(x(i+4)+x(i))\bmod 2, \text{ and}$$

$$[x(6)x(5)x(4)x(3)x(2)x(1)x(0)]=[1110110]$$

A value range of n is $[0,127)$. Therefore, it can be learned that a length of the sequence of the PSS is 127. A value of $d_{pss}(n)$ is determined by $x(m)$, and $$N_{ID}^{(2)}$$

has three values. Therefore, there are three m values corresponding to each $n \in [0,127)$, and $d_{pss}(n)$ finally has three values, that is, the PSS has three sequences. Therefore, the terminal device may obtain a used $$N_{ID}^{(2)}$$

value based on a deleted sequence of the PSS.

The sequence $d_{sss}(n)$ of the SSS is defined as follows (refer to 38.211-7.4.2.3.1):

$$d_{sss}(n) = [1 - 2x_0((n + m_0)\bmod 127)][1 - 2x_1((n + m_1)\bmod 127)]$$

$$m_0 = 15\left\lfloor \frac{N_{ID}^{(1)}}{112} \right\rfloor + 5N_{ID}^{(2)}, \text{ where}$$

$$m_1 = N_{ID}^{(1)}\bmod 112$$

$$0 \leq n < 127$$

$$x_0(i + 7) = (x_0(i + 4) + x_0(i))\bmod 2, \text{ and}$$

$$x_1(i + 7) = (x_1(i + 4) + x_1(i))\bmod 2$$

$$[x_0(6) \ x_0(5) \ x_0(4) \ x_0(3) \ x_0(2) \ x_0(1) \ x_0(0)] = [0\ 0\ 0\ 0\ 0\ 0\ 1]$$

$$[x_1(6) \ x_1(5) \ x_1(4) \ x_1(3) \ x_1(2) \ x_1(1) \ x_1(0)] = [0\ 0\ 0\ 0\ 0\ 0\ 1].$$

It can be learned that a length of the sequence of the SSS is also 127. It can be learned from a value of $m_0$ whether a value of $$N_{ID}^{(1)}$$

is within a range of $[0,111]$, $[112,223]$, or $[224,335]$. An offset of $$N_{ID}^{(1)}$$

in the foregoing range may be obtained from a value of $m_1$. Finally, the value of $$N_{ID}^{(1)}$$

may be obtained.

For example, it is known that $m_0$ is 20 and $m_1$ is 100, and it is learned by detecting the sequence of the PSS that $$N_{ID}^{(2)}$$

In this case, a value of $$\left\lfloor \frac{N_{ID}^{(1)}}{112} \right\rfloor$$

is 1, and $$N_{ID}^{(1)}$$

should be within the range of [112,223]. In this range, a number that can be divided by 112 to obtain a remainder 100 is as follows: 112+100=212. A physical cell ID that may be finally obtained is 3×212+1.

A cell parameter ID for determining the sequence of the first SSS may be 335, and therefore a value range, of $$N_{ID}^{(1)},$$

that corresponds to the first SSS is [0, 335]. A cell parameter ID for determining the sequence of the second SSS may be greater than 335, and therefore a value range, of $$N_{ID}^{(1)},$$

that corresponds to the second SSS may be [335, X]. The first SSS corresponds to 336 values of $$N_{ID}^{(1)},$$

and the second SSS also corresponds to 336 values of $$N_{ID}^{(1)}.$$

For example, a value of X may be 671, for example, the value range, of $$N_{ID}^{(1)},$$

that corresponds to the second SSS may be [336, 671], and the second SSS may also correspond to 200 values of $$N_{ID}^{(1)}.$$

For example, a value of X may be 536, for example, the value range, of $$N_{ID}^{(1)},$$

that corresponds to the second SSS may be [336, 536]. The value of X is not specifically limited in an embodiment of the application.

Therefore, the first SSB and the second SSB correspond to different value ranges of $$N_{ID}^{(1)},$$

and therefore the first SSS is different from the second SSS. The terminal device can distinguish between the first network type and the second network type by performing blind detection on the sequence of the first SSS and the sequence of the second SSS through frequency sweeping, and further determine the access network.

Based on the foregoing operation, in the case in which the initial value for determining the first PBCH may be different from the initial value for determining the second PBCH, and therefore the first SSB is different from the second SSB, details are as follows:

According to stipulation in the 3GPP protocols TS 38.212 7.1.2 and TS 38.211 7.3.3, when two-level scrambling is performed on the PBCH by using a pseudo-random sequence, in the PBCH, a signal source bit may be scrambled once before channel encoding, and a bit stream may be scrambled again after rate matching. Initial values of used scrambling pseudo-random sequences are all cell IDs. A formula for determining an initial value of the first pseudo-random sequence may be as follows:

$$C_{init1} = N_{ID}^{cell},$$

where
a value of a cell ID may be within [0, 1007].

An initial value for determining a pseudo-random sequence may be changed. In this case, a formula for determining an initial value of the second pseudo-random sequence is as follows:

$$C_{init2} = N_{ID}^{cell} + \text{offset},$$

where
a value range of the offset is [1008, 231-1008]. The initial value used to determine the first pseudo-random sequence is different from the initial value used to determine the second pseudo-random sequence; in this case, the first pseudo-random sequence is different from the second pseudo-random sequence.

Therefore, the initial value used to determine the first pseudo-random sequence is different from the initial value used to determine the second pseudo-random sequence, so that the first SSB can be different from the second SSB. The terminal device may distinguish between the first network type and the second network type by descrambling the received PBCH by using the first pseudo-random sequence and/or the second pseudo-random sequence, and further determine the access network.

Based on the foregoing operation, in the case in which the frame structure of the first SSB may be different from the frame structure of the second SSB, and therefore the first SSB is different from the second SSB, details are as follows:

Frequency domain mapping locations and time domain mapping locations corresponding to the PSS, the SSS, and the PBCH in the first SSB are shown in FIG. 1. The frame structure of the first SSB may be changed, for example, a frequency domain mapping location and/or a time domain mapping location corresponding to one or more of the PSS, the SSS, and the PBCH in the first SSB are changed to obtain the second SSB, so that the first SSB is different from the second SSB. For example, a frequency shift may be performed on one or more subcarriers of the PSS in frequency domain. For example, a frequency shift range of the PSS may be subcarriers 1 to 55, or may be subcarriers –55 to –1. Alternatively, a frequency shift may be performed on one or more subcarriers of the SSS in frequency domain. For example, a frequency shift range of the SSS may be subcarriers 1 to 8, or may be subcarriers –8 to –1. Alternatively, a frequency shift may be performed on one or more subcarriers of the PBCH in frequency domain. Alternatively, locations of four time domain symbols in the first SSB may be exchanged to obtain the second SSB. For example, locations of symbols of the PSS and the SSS in the first SSB may be exchanged to obtain the second SSB, so that the frame structure of the first SSB is different from the frame structure of the second SSB.

Therefore, the frame structure of the first SSB is different from the frame structure of the second SSB, and therefore the first SSB can be different from the second SSB. The terminal device may distinguish between the first network type and the second network type by performing matching between the frame structure of the first SSB and/or the frame structure of the second SSB and the frame structure of the received SSB, and further determine the access network.

Figure 8:
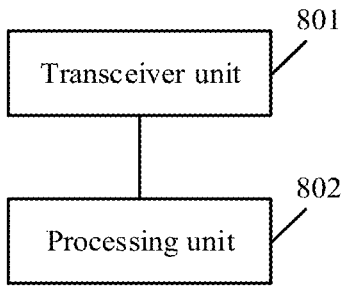
FIG. 8 is a schematic diagram of a structure of a communication apparatus according to an embodiment of this application.

Based on the foregoing network architecture, FIG. 8 is a schematic diagram of a structure of another communication apparatus according to an embodiment of this application. The communication apparatus may be a terminal device, or may be a module (for example, a chip) in a terminal device. As shown in FIG. 8, the communication apparatus may include:

a transceiver unit 801 that may be configured to receive one or more SSBs; and a processing unit 802 that may be configured to determine, based on a first SSB and/or a second SSB, a network type corresponding to the one or more SSBs, where the processing unit 802 may be further configured to determine an access network based on the network type.

In an embodiment, the SSB includes a PSS, and that the processing unit 802 determines, based on a first SSB and/or a second SSB, a network type corresponding to the one or more SSBs includes:

when the PSS successfully matches a first PSS, determining that the network type corresponding to the SSB is a first network type, where the first PSS is a PSS in the first SSB; and/or when the PSS successfully matches a second PSS, determining that the network type corresponding to the SSB is a second network type, where the second PSS is a PSS in the second SSB.

In an embodiment, the SSB includes an SSS, and that the processing unit 802 determines, based on a first SSB and/or a second SSB, a network type corresponding to the one or more SSBs includes:

when the SSS successfully matches a first SSS, determining that the network type corresponding to the SSB is a first network type, where the first SSS is an SSS in the first SSB; and/or when the SSS successfully matches a second SSS, determining that the network type corresponding to the SSB is a second network type, where the second SSS is an SSS in the second SSB.

In an embodiment, the SSB includes a PBCH, and that the processing unit 802 determines, based on a first SSB and/or a second SSB, a network type corresponding to the one or more SSBs includes:

when the PBCH is successfully descrambled by using a first pseudo-random sequence, determining that the network type corresponding to the SSB is a first network type; and/or when the PBCH is successfully descrambled by using a second pseudo-random sequence, determining that the network type corresponding to the SSB is a second network type.

In an embodiment, that the processing unit 802 determines, based on a first SSB and/or a second SSB, a network type corresponding to the one or more SSBs includes:

when a frame structure of the SSB matches a frame structure of the first SSB, determining that the network type corresponding to the SSB is a first network type; and/or when a frame structure of the SSB matches a frame structure of the second SSB, determining that the network type corresponding to the SSB is a second network type, where the frame structure of the SSB includes frequency domain mapping locations and time domain mapping locations corresponding to a PSS, an SSS, and a PBCH in the SSB.

In an embodiment, the first network type is new radio NR, and the second network type is a non-terrestrial network NTN.

In an embodiment, a sequence of the second PSS and a sequence of the first PSS meet a frequency domain mapping relationship; and/or a sequence of the second PSS is obtained by interleaving a sequence of the first PSS; and/or a cyclic shift value and/or a primitive polynomial of the second PSS are or is different from a cyclic shift value and/or a primitive polynomial of the first PSS.

In an embodiment, numbers of the sequence, of the second PSS, that is obtained by mapping the sequence of the first PSS in frequency domain are as follows:

[119 87 55 23 123 91 59 27 125 93 61 29 121 89 57 25 96 64 32 101 69 37 5 99 67 35 3 113 81 49 17 117 85 53 21 114 82 50 18 118 86 54 22 115 83 51 19 98 66

34 2 126 94 62 30 110 78 46 14 97 65 33 1 109 77 45 13 107 75 43 11 104 72 40 8 100 68 36 4 108 76 44 12 102 70 38 6 112 80 48 16 127 95 63 31 116 84 52 20 103 71 39 7 111 79 47 15 124 92 60 28 120 88 56 24 122 90 58 26 106 74 42 10 105 73 41 9].

In an embodiment, a sequence of the SSS is determined based on a cell parameter identifier ID, and a cell parameter identifier ID for determining a sequence of the second SSS is different from a cell parameter identifier ID for determining a sequence of the first SSS.

In an embodiment, the first pseudo-random sequence is used to descramble a first PBCH, the second pseudo-random sequence is used to descramble a second PBCH, the first PBCH is a PBCH in the first SSB, the second PBCH is a PBCH in the second SSB, and an initial value for determining the first pseudo-random code is different from an initial value for determining the second pseudo-random code.

In an embodiment, that a sequence of the second PSS is obtained by interleaving a sequence of the first PSS includes:

adding 0 to an end of the sequence of the first PSS to obtain a sequence, where the sequence is a sequence of 2 to a power of N, and N is an integer greater than or equal to 0;

mapping the sequence to a matrix block in order of rows to obtain a first matrix, where the matrix block is a $2^J \times 2^K$ matrix block, J is an integer greater than or equal to 0, K is an integer greater than or equal to 0, and N is equal to a sum of J and K;

performing column permutation on the first matrix to obtain a second matrix; and reading data of the second matrix by column to obtain the sequence of the second PSS.

In an embodiment, a frequency domain mapping location and/or a time domain mapping location corresponding to one or more of a PSS, an SSS, and a PBCH in the first SSB are or is different from a frequency domain mapping location and/or a time domain mapping location corresponding to one or more of a PSS, an SSS, and a PBCH in the second SSB.

More detailed descriptions of the transceiver unit 801 and the processing unit 802 may be directly obtained by directly referring to related descriptions of the terminal device in the method embodiment shown in FIG. 3. Details are not described herein again.

Figure 9:
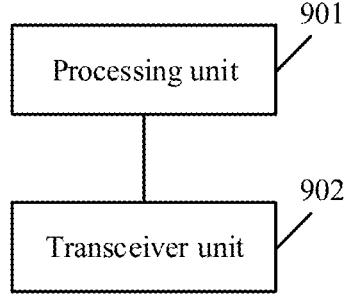
FIG. 9 is a schematic diagram of a structure of another communication apparatus according to an embodiment of this application.

Based on the foregoing network architecture, FIG. 9 is a schematic diagram of a structure of a communication apparatus according to an embodiment of this application. The communication apparatus may be a network device, or may be a module (for example, a chip) in a network device. As shown in FIG. 9, the communication apparatus may include:

a processing unit 901 that may be configured to determine an SSB; and a transceiver unit 902 that may be configured to send the SSB to a terminal device, where the SSB is a first SSB or a second SSB, the first SSB and the second SSB correspond to different network types, and the SSB is used by the terminal device to determine a network type.

In an embodiment, the SSB includes a PSS, a PSS in the first SSB is a first PSS, and a PSS in the second SSB is a second PSS; and a sequence of the second PSS and a sequence of the first PSS meet a frequency domain mapping relationship; and/or a sequence of the second PSS is obtained by interleaving a sequence of the first PSS; and/or a cyclic shift value and/or a primitive polynomial of the second PSS are or is different from a cyclic shift value and/or a primitive polynomial of the first PSS.

In an embodiment, numbers of the sequence, of the second PSS, that is obtained by mapping the sequence of the first PSS in frequency domain are as follows:

[119 87 55 23 123 91 59 27 125 93 61 29 121 89 57 25 96 64 32 101 69 37 5 99 67 35 3 113 81 49 17 117 85 53 21 114 82 50 18 118 86 54 22 115 83 51 19 98 66 34 2 126 94 62 30 110 78 46 14 97 65 33 1 109 77 45 13 107 75 43 11 104 72 40 8 100 68 36 4 108 76 44 12 102 70 38 6 112 80 48 16 127 95 63 31 116 84 52 20 103 71 39 7 111 79 47 15 124 92 60 28 120 88 56 24 122 90 58 26 106 74 42 10 105 73 41 9].

In an embodiment, the SSB includes an SSS, a sequence of the SSS is determined based on a cell parameter identifier ID, an SSS in the first SSB is a first SSS, an SSS in the second SSB is a second SSS, and a cell parameter identifier ID for determining a sequence of the second SSS is different from a cell parameter identifier ID for determining a sequence of the first SSS.

In an embodiment, the SSB includes a PBCH, a PBCH in the first SSB is a first PBCH, a PBCH in the second SSB is a second PBCH, an initial value for determining the first PBCH is different from an initial value for determining the second PBCH, the initial value is used to determine a pseudo-random sequence, and the pseudo-random sequence is used to scramble the PBCH.

In an embodiment, that a sequence of the second PSS is obtained by interleaving a sequence of the first PSS includes:

adding 0 to an end of the sequence of the first PSS to obtain a sequence, where the sequence is a sequence of 2 to a power of N, and N is an integer greater than or equal to 0;

mapping the sequence to a matrix block in order of rows to obtain a first matrix, where the matrix block is a $2^J \times 2^K$ matrix block, J is an integer greater than or equal to 0, K is an integer greater than or equal to 0, and N is equal to a sum of J and K;

performing column permutation on the first matrix to obtain a second matrix; and reading data of the second matrix by column to obtain the sequence of the second PSS.

In an embodiment, a frequency domain mapping location and/or a time domain mapping location corresponding to one or more of a PSS, an SSS, and a PBCH in the first SSB are or is different from a frequency domain mapping location and/or a time domain mapping location corresponding to one or more of a PSS, an SSS, and a PBCH in the second SSB.

In an embodiment, that the SSB is used by the terminal device to determine a network type includes:

The SSB is used by the terminal device to: when the PSS successfully matches the first PSS, determine that the network type corresponding to the SSB is a first network type; or when the PSS successfully matches the second PSS, determine that the network type corresponding to the SSB is a second network type.

In an embodiment, that the SSB is used by the terminal device to determine a network type includes:

The SSB is used by the terminal device to: when the SSS successfully matches the first SSS, determine that the network type corresponding to the SSB is a first network type; or when the SSS successfully matches the second SSS, determine that the network type corresponding to the SSB is a second network type.

In an embodiment, that the SSB is used by the terminal device to determine a network type includes:

The SSB is used by the terminal device to: when the PBCH is descrambled by using the first pseudo-random sequence and the PBCH is successfully decoded, determine that the network type corresponding to the SSB is a first network type; or when the PBCH is descrambled by using the second pseudo-random sequence and the PBCH is successfully decoded, determine that the network type corresponding to the SSB is a second network type.

In an embodiment, that the SSB is used by the terminal device to determine a network type includes:

The SSB is used by the terminal device to: when a frame structure of the SSB matches a frame structure of the first SSB, determine that the network type corresponding to the SSB is a first network type; or when a frame structure of the SSB matches a frame structure of the second SSB, determine that the network type corresponding to the SSB is a second network type, where the frame structure of the SSB includes frequency domain mapping locations and time domain mapping locations corresponding to the PSS, the SSS, and the PBCH in the SSB.

In an embodiment, the first network type is new radio NR, and the second network type is a non-terrestrial network NTN.

More detailed descriptions of the processing unit 901 and the transceiver unit 902 may be directly obtained by directly referring to related descriptions of the network device in the method embodiment shown in FIG. 3. Details are not described herein again.

Figures 10, 11:
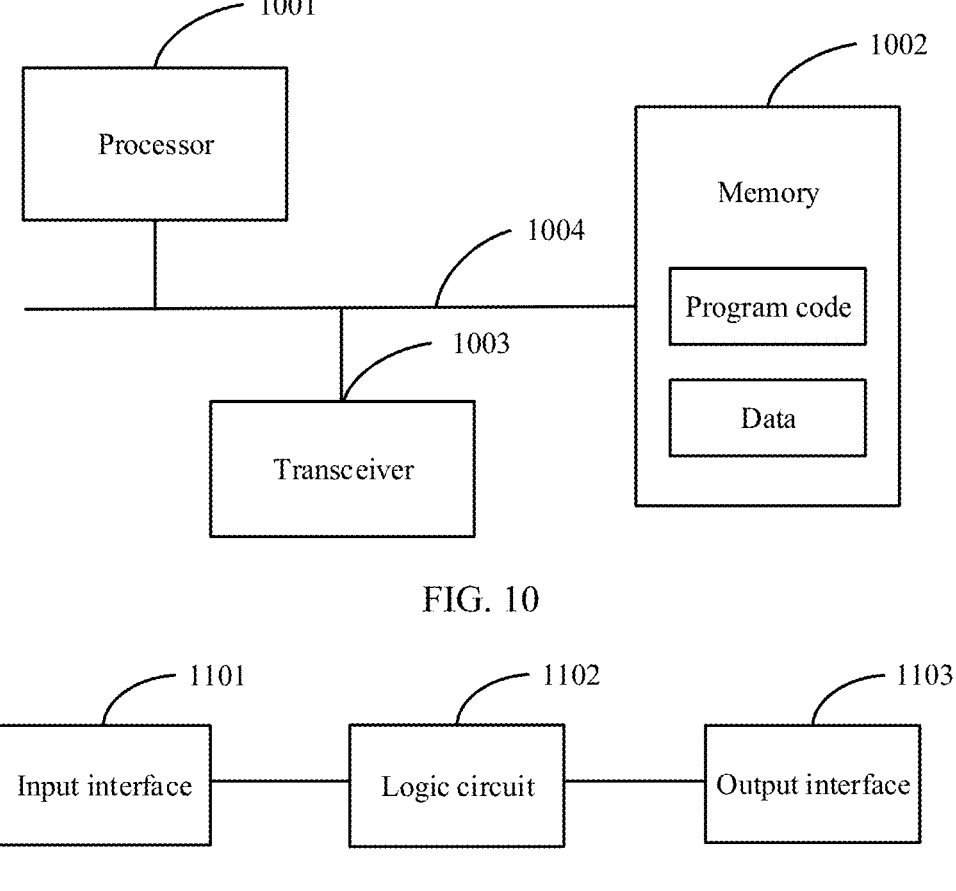
FIG. 10 is a schematic diagram of a structure of still another communication apparatus according to an embodiment of this application.
FIG. 11 is a schematic diagram of a structure of still another communication apparatus according to an embodiment of this application.

Based on the foregoing network architecture, FIG. 10 is a schematic diagram of a structure of still another communication apparatus according to an embodiment of this application. As shown in FIG. 10, the communication apparatus may include a processor 1001, a memory 1002, a transceiver 1003, and a bus 1004. The memory 1002 may exist independently, and may be connected to the processor 1001 by using the bus 1005. Alternatively, the memory 1002 may be integrated with the processor 1001. The memory 1002 stores instructions or program code, and may further store data. The bus 1005 is configured to connect the components. The bus is represented by a bold line in FIG. 10. A connection manner between other components is described merely as an example and does not constitute a limitation. The bus 1005 may be classified into an address bus, a data bus, a control bus, and the like. For ease of representation, only one thick line is for representing the bus in FIG. 10, but this does not mean that there is only one bus or only one type of bus.

In an embodiment, the communication apparatus may be a terminal device or a module (for example, a chip) in a terminal device. When the computer program instructions stored in the memory 1002 are executed, the transceiver 1003 may be configured to perform an operation performed by the transceiver unit 801 in the foregoing embodiment, for example, may receive one or more SSBs; and the processor 1001 is configured to perform an operation performed by the processing unit 802 in the foregoing embodiment, for example, may determine, based on a first SSB and/or a second SSB, a network type corresponding to the one or more SSBs, and may be further configured to determine an access network based on the network type.

It should be noted that the communication apparatus in an embodiment of the application may correspond to the terminal device in the method embodiment provided in this application, and operations and/or functions of the modules in the communication apparatus may respectively implement corresponding processes of the method in FIG. 3. For brevity, details are not described herein again.

In an embodiment, the communication apparatus may be a network device or a module (for example, a chip) in a network device. When the computer program instructions stored in the memory 1002 are executed, the processor 1001 is configured to perform an operation performed by the processing unit 901 in the foregoing embodiment, for example, may determine an SSB; and the transceiver 1003 may be configured to perform an operation performed by the transceiver unit 902 in the foregoing embodiment, for example, may send the SSB to a terminal device, where the SSB is a first SSB or a second SSB, the first SSB and the second SSB correspond to different network types, and the SSB is used by the terminal device to determine a network type.

It should be noted that the communication apparatus in an embodiment of the application may correspond to the network device in the method embodiment provided in this application, and operations and/or functions of the modules in the communication apparatus may respectively implement corresponding processes of the method in FIG. 3. For brevity, details are not described herein again.

Based on the foregoing network architecture, FIG. 11 is a schematic diagram of a structure of still another communication apparatus according to an embodiment of this application. As shown in FIG. 11, the communication apparatus may include an input interface 1101, a logic circuit 1102, and an output interface 1103. The input interface 1101 is connected to the output interface 1103 by using the logic circuit 1102. The input interface 1101 is configured to obtain data or a signal, and the output interface 1103 is configured to output data or a signal. The logic circuit 1102 is configured to perform an operation other than operations of the input interface 1101 and the output interface 1103, for example, to implement a function implemented by the processor 1001 in the foregoing embodiment. The communication apparatus may be a network device or a module in a network device, or may be a terminal device or a module in a terminal device. More detailed descriptions of the input interface 1101, the logic circuit 1102, and the output interface 1103 may be directly obtained by directly referring to related descriptions of the terminal device or the network device in the foregoing method embodiments. Details are not described herein again.

An embodiment of this application further provides a computer-readable storage medium. The computer-readable storage medium stores a computer program. When the program is executed by a processor, a process related to a terminal device in the communication method provided in the foregoing method embodiments may be implemented.

An embodiment of this application further provides a computer-readable storage medium. The computer-readable storage medium stores a computer program. When the program is executed by a processor, a process related to a network device in the communication method provided in the foregoing method embodiments may be implemented.

An embodiment of this application further provides a computer program product. When the computer program product is run on a computer or a processor, the computer or the processor is enabled to perform one or more operations of any one of the foregoing communication methods. When the component modules of the foregoing devices are implemented in a form of software functional units and sold or used as independent products, the component modules may be stored in the computer-readable storage medium.

An embodiment of this application further provides a communication system. The communication system may include a network device and a terminal device. For descriptions, refer to the communication method shown in FIG. 3.

It should be understood that the memory mentioned in embodiments of this application may be a volatile memory or a nonvolatile memory, or may include a volatile memory and a nonvolatile memory. The nonvolatile memory may be a hard disk drive (HDD), a solid-state drive (solid-state drive, SSD), a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). The memory is any other medium that can carry or store expected program code in a form of an instruction or a data structure and that can be accessed by a computer, but is not limited thereto. The memory in an embodiment of the application may alternatively be a circuit or any other apparatus that can implement a storage function, and is configured to store program instructions and/or data.

It should be further understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be noted that when the processor is a general purpose processor, a DSP, an ASIC, an FPGA or another programmable logic device, a discrete gate, a transistor logic device, or a discrete hardware component, the memory (a storage module) is integrated into the processor.

It should be noted that the memory described in this specification is intended to include but not limited to these memories and any memory of another appropriate type.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

One of ordinary skilled in the art may be aware that, in combination with the examples described in embodiments disclosed in this specification, units and algorithm operations can be implemented by electronic hardware or a combination of computer software and electronic hardware. Whether the functions are performed by hardware or software depends on particular applications and design constraints of the technical solutions. One of ordinary skilled in the art may use different methods to implement the described functions for each particular application, but it should not be considered that the implementation goes beyond the scope of this application.

It may be clearly understood by one of ordinary skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division, or may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The foregoing storage medium includes any medium that can store program code, such as a USB flash drive, a removable hard disk, a ROM, a RAM, a magnetic disk, or an optical disc.

A sequence of the operations of the method in embodiments of this application may be adjusted, combined, or removed based on an actual requirement.

The modules/units of the apparatus in embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, one of ordinary skilled in the art should understand that modifications to the technical solutions described in the foregoing embodiments or equivalent replacements to some technical features thereof may still be made, without departing from the scope of the technical solutions of embodiments of this application.

What is claimed is:

1. A communication method, comprising:
receiving one or more synchronization signal blocks (SSBs);
determining, based on one or more SSBs including a first SSB and/or a second SSB, a type of a network corresponding to the one or more SSBs, wherein the type of the network includes a non-terrestrial network (NTN); and
determining an access network based on the type of the network, wherein
a first type of the network is new radio (NR), and
a second type of the network is the NTN.

2. The method according to claim 1, wherein each SSB comprises a primary synchronization signal (PSS), and wherein the determining the type of the network corresponding to the one or more SSBs comprises:
when the PSS successfully matches a first PSS, determining that the type of the network corresponding to the SSB is the first type of the network, wherein the first PSS is in the first SSB; and/or
when the PSS successfully matches a second PSS, determining that the type of the network corresponding to the SSB is the second type of the network, wherein the second PSS is in the second SSB.

3. The method according to claim 1, wherein each SSB comprises a secondary synchronization signal (SSS), and wherein the determining the type of the network corresponding to the one or more SSBs comprises:
when the SSS successfully matches a first SSS, determining that the type of the network corresponding to the SSB is the first type of the network, wherein the first SSS is in the first SSB; and/or
when the SSS successfully matches a second SSS, determining that the type of the network corresponding to the SSB is the second type of the network, wherein the second SSS is in the second SSB.

4. The method according to claim 1, wherein each SSB comprises a physical broadcast channel (PBCH), and wherein the determining the type of the network corresponding to the one or more SSBs comprises:
when the PBCH is successfully descrambled by using a first pseudo-random sequence, determining that the type of the network corresponding to the SSB is the first type of the network; and/or
when the PBCH is successfully descrambled by using a second pseudo-random sequence, determining that the type of the network corresponding to the SSB is the second type of the network.

5. The method according to claim 1, wherein the determining the type of the network corresponding to the one or more SSBs comprises:
when a frame structure of a SSB matches a frame structure of a first SSB, determining that the type of the network corresponding to the SSB is the first type of the network; and/or
when a frame structure of the SSB matches a frame structure of a second SSB, determining that the type of the network corresponding to the SSB is the second type of the network, wherein the frame structure of the SSB comprises frequency domain mapping locations and time domain mapping locations corresponding to a PSS, an SSS, and a PBCH in the SSB.

6. The method according to claim 2, wherein a sequence of the second PSS and a sequence of the first PSS meet a frequency domain mapping relationship, and/or
a sequence of the second PSS is obtained by interleaving a sequence of the first PSS, and/or
a cyclic shift value and/or a primitive polynomial of the second PSS is different from a cyclic shift value and/or a primitive polynomial of the first PSS.

7. The method according to claim 6, wherein numbers of the sequence, of the second PSS, that is obtained by mapping the sequence of the first PSS in frequency domain are as follows:
[119 87 55 23 123 91 59 27 125 93 61 29 121 89 57 25 96 64 32 101 69 37 5 99 67 35 3 113 81 49 17 117 85 53 21 114 82 50 18 118 86 54 22 115 83 51 19 98 66 34 2 126 94 62 30 110 78 46 14 97 65 33 1 109 77 45 13 107 75 43 11 104 72 40 8 100 68 36 4 108 76 44 12 102 70 38 6 112 80 48 16 127 95 63 31 116 84 52 20 103 71 39 7 111 79 47 15 124 92 60 28 120 88 56 24 122 90 58 26 106 74 42 10 105 73 41 9].

8. The method according to claim 3, wherein
a sequence of the SSS is determined based on a cell parameter identifier ID; and
a cell parameter identifier ID for determining a sequence of the second SSS is different from a cell parameter identifier ID for determining a sequence of the first SSS.

9. The method according to claim 4, wherein the first pseudo-random sequence is used to descramble a first PBCH, the second pseudo-random sequence is used to descramble a second PBCH, the first PBCH is in a first SSB, and the second PBCH is in a second SSB; and
an initial value for determining the first pseudo-random sequence is different from an initial value for determining the second pseudo-random sequence.

10. The method according to claim 6, wherein that the sequence of the second PSS is obtained by interleaving the sequence of the first PSS comprises:
adding 0 to an end of the sequence of the first PSS to obtain a sequence, wherein the sequence is 2 to a power of N, and N is an integer greater than or equal to 0;
mapping the sequence to a matrix block in order of rows to obtain a first matrix, wherein the matrix block is a $2^J \times 2^K$ matrix block, J is an integer greater than or equal to 0, K is an integer greater than or equal to 0, and N is equal to a sum of J and K;
performing column permutation on the first matrix to obtain a second matrix; and
reading data of the second matrix by column to obtain the sequence of the second PSS.

11. The method according to claim 5, wherein a frequency domain mapping location and/or a time domain mapping location corresponding to one or more of a PSS, an SSS, and a PBCH in the first SSB are or is different from a frequency domain mapping location and/or a time domain mapping location corresponding to one or more of a PSS, an SSS, and a PBCH in the second SSB.

12. A communication method, comprising:
determining a synchronization signal block (SSB); and
sending the SSB to a terminal device, wherein the SSB is a first SSB or a second SSB, the first SSB and the second SSB correspond to different network types, and the SSB is used by the terminal device to determine a type of a network including a non-terrestrial network (NTN), wherein
a first type of the network is new radio (NR), and
a second type of the network is the NTN.

13. The method according to claim 12, wherein each SSB comprises a primary synchronization signal (PSS);

a PSS in the first SSB is a first PSS, and a PSS in the second SSB is a second PSS; and a sequence of the second PSS and a sequence of the first PSS meet a frequency domain mapping relationship, and/or a sequence of the second PSS is obtained by interleaving a sequence of the first PSS, and/or a cyclic shift value and/or a primitive polynomial of the second PSS is different from a cyclic shift value and/or a primitive polynomial of the first PSS.

14. The method according to claim 13, wherein numbers of the sequence, of the second PSS, that is obtained by mapping the sequence of the first PSS in frequency domain are as follows:

[119 87 55 23 123 91 59 27 125 93 61 29 121 89 57 25 96 64 32 101 69 37 5 99 67 35 3 113 81 49 17 117 85 53 21 114 82 50 18 118 86 54 22 115 83 51 19 98 66 34 2 126 94 62 30 110 78 46 14 97 65 33 1 109 77 45 13 107 75 43 11 104 72 40 8 100 68 36 4 108 76 44 12 102 70 38 6 112 80 48 16 127 95 63 31 116 84 52 20 103 71 39 7 111 79 47 15 124 92 60 28 120 88 56 24 122 90 58 26 106 74 42 10 105 73 41 9].

15. The method according to claim 12, wherein each SSB comprises a secondary synchronization signal (SSS);

a sequence of the SSS is determined based on a cell parameter identifier ID;

an SSS in the first SSB is a first SSS, and an SSS in the second SSB is a second SSS; and a cell parameter identifier ID for determining a sequence of the second SSS is different from a cell parameter identifier ID for determining a sequence of the first SSS.

16. The method according to claim 12, wherein each SSB comprises a physical broadcast channel (PBCH);

a PBCH in the first SSB is a first PBCH, and a PBCH in the second SSB is a second PBCH; and an initial value for determining the first PBCH is different from an initial value for determining the second PBCH, the initial value is used to determine a pseudo-random sequence, and the pseudo-random sequence is used to scramble the PBCH.

17. The method according to claim 13, wherein that the sequence of the second PSS is obtained by interleaving the sequence of the first PSS comprises:

adding 0 to an end of the sequence of the first PSS to obtain a sequence, wherein the sequence is 2 to a power of N, and N is an integer greater than or equal to 0;

mapping the sequence to a matrix block in order of rows to obtain a first matrix, wherein the matrix block is a $2^J \times 2^K$ matrix block, J is an integer greater than or equal to 0, K is an integer greater than or equal to 0, and N is equal to a sum of J and K;

performing column permutation on the first matrix to obtain a second matrix; and reading data of the second matrix by column to obtain the sequence of the second PSS.

18. The method according to claim 12, wherein a frequency domain mapping location and/or a time domain mapping location corresponding to one or more of a PSS, an SSS, or a PBCH in the first SSB is different from a frequency domain mapping location and/or a time domain mapping location corresponding to one or more of a PSS, an SSS, or a PBCH in the second SSB.

19. A communication apparatus, comprising:

a processor, and a memory coupled to the processor to store instructions, which when executed by the processor, cause the apparatus to perform operations, the operations comprising:

receiving one or more synchronization signal blocks (SSBs); and determining, based on a first SSB and/or a second SSB, a type of a network corresponding to the one or more SSBs, wherein the type of the network includes a non-terrestrial network (NTN), wherein determining an access network based on the type of the network, wherein a first type of the network is new radio (NR), and a second type of the network is the NTN.

20. The apparatus according to claim 19, wherein each SSB comprises a primary synchronization signal (PSS), and wherein the determining the type of the network corresponding to the one or more SSBs comprises:

when the PSS successfully matches a first PSS, determining that the type of the network corresponding to the SSB is the first type of the network, wherein the first PSS is in the first SSB; and/or when the PSS successfully matches a second PSS, determining that the type of the network corresponding to the SSB is the second type of the network, wherein the second PSS is in the second SSB.

* * * * *